April 7, 1964 O. D. COLVIN ETAL 3,128,158

APPARATUS FOR CONTROLLING ATMOSPHERIC CONDITIONS IN STORAGE COMPARTMENTS

Filed Sept. 27, 1960 9 Sheets-Sheet 1

INVENTORS.
OLIVER D. COLVIN.
BY ROBERT W. FURMAN.

Ward, Neal, Haselton, Orme & McElhannon
ATTORNEYS.

INVENTORS.
OLIVER D. COLVIN.
BY ROBERT W. FURMAN.
Ward, Neal, Haselton, Orme & McElhannon
ATTORNEYS.

INVENTORS,
OLIVER D. COLVIN,
BY ROBERT W. FURMAN,
Ward, Neal, Haselton, Orme & McElhannon
ATTORNEYS April 7, 1964 O. D. COLVIN ETAL 3,128,158

APPARATUS FOR CONTROLLING ATMOSPHERIC CONDITIONS IN STORAGE COMPARTMENTS

Filed Sept. 27, 1960 9 Sheets-Sheet 4

INVENTORS
OLIVER D. COLVIN,
ROBERT W. FURMAN.
BY
Ward, Neal, Haselton, Orme & McElhannon
ATTORNEYS.

INVENTORS
OLIVER D. COLVIN.
ROBERT W. FURMAN.
BY
Ward, Neal, Haselton, Orme & McElhannon
ATTORNEYS.

INVENTORS.
OLIVER D. COLVIN.
ROBERT W. FURMAN.
BY
Ward, Neal, Haselton, Orme & McElhannon
ATTORNEYS.

INVENTORS.
OLIVER D. COLVIN.
ROBERT W. FURMAN.
BY
Wardhealt Haselton, Orme & McElhannon
ATTORNEYS.

INVENTORS.
OLIVER D. COLVIN.
ROBERT W. FURMAN.
BY
Ward, Neal, Haselton, Orme & McElhannon
ATTORNEYS.

April 7, 1964 O. D. COLVIN ET AL 3,128,158

APPARATUS FOR CONTROLLING ATMOSPHERIC CONDITIONS IN STORAGE COMPARTMENTS

Filed Sept. 27, 1960 9 Sheets-Sheet 9

INVENTORS.
OLIVER D. COLVIN
BY ROBERT W. FURMAN,

Ward, Neal, Haselton, Orme & McElhannon
ATTORNEYS.

United States Patent Office 3,128,158

Patented Apr. 7, 1964

3,128,158

APPARATUS FOR CONTROLLING ATMOSPHERIC CONDITIONS IN STORAGE COMPARTMENTS

Oliver D. Colvin, 459 Exeter Road, Hampton, N.H., and Robert W. Furman, 142 Robinson Place, Shrewsbury, N.J.

Filed Sept. 27, 1960, Ser. No. 58,749
7 Claims. (Cl. 34—50)

This invention relates to methods and apparatus for controlling atmospheric conditions in storage compartments, and more particularly to novel methods and apparatus for preventing damage to cargo resulting from moisture condensation in the holds or storage compartments of ships.

One of the objects of the present invention is to provide novel methods and apparatus for preventing damage to cargo resulting from condensation which may form on cargo per se due to conditions within a ship's hold or within some other storage compartment in which cargo is stowed, and including cargo which may or may not be further contained inside a storage van located within the ship's hold. Such van may be of the type which may be stacked in substantial number within the ship's hold.

A further object is to prevent damage to such cargo resulting from condensation forming within and on the interior surfaces of such a hold and/or such a storage van, the condensation dripping on or otherwise contacting and wetting the cargo.

Another object is to prevent the aforementioned damage to cargo by a novel system of apparatus which occupies substantially less space than heretofore required, this being an important advantage aboard ship, and which system is much lighter in weight, and far lower in cost and energy consumption as compared to systems of the prior art.

Another object is to provide novel methods and apparatus for quickly reaching a low dewpoint temperature in a hold or storage van of the above character so that cool cargo will not sweat while it is tempering or warming up to and beyond the dewpoint temperature of the port of discharge. The expression dewpoint as used herein means dewpoint temperature.

In methods and apparatus heretofore proposed embodying prior art technique of hold dehumidification, the principal object was to prevent "ship-sweat," and the presence of "cargo-sweat" has been unknown to or considered by many ship operators and experts in the art to be of little practical importance. Ship sweat is condensation which occurs on the interior surfaces of a ship's cargo hold such as side plating, overhead deck and deck beams when the dewpoint temeprature of the air in the hold rises above the temperature of any such surface or if the surface cools below the dewpoint temperature of such air. This condensation can damage the cargo by falling on it from above or by contact soaking from side plating or flooring. Cargo sweat is condensation which occurs on certain types of cargo such as metals, canned goods, plate glass and machinery which have a high rate of heat transfer, when the dewpoint temperature of the air in the hold in contact with the surface of such cargo elements rises above the temperature of such surfaces, as when ventilating cargo loaded cool with weather air of a subsequent different climate.

In recent years the cure of ship-sweat has disclosed the great damage which is now revealed to result from cargo-sweat, this being now established because more canned goods and other cargoes having a high rate of heat absorption are presently being carried aboard ship and also because vessels now have much higher speed than heretofore so that cargo has much less time during a voyage in which to warm up. This lag in temperature rise results in sweat on the cargo while within the ship, as well as cargo-sweat after discharge in a port of high ambient dewpoint temperature. Also the modern practice of employing powerful mechanical ventilation as contrasted to former natural cowl ventilator ducts increases the rate of cargo-sweat damage by driving large quanitities of wet high dewpoint weather air onto the cargo.

Such prior art practices embodied three concepts:

(1) *Ventilation.*—A positive ventilation with weather air as the source when such air is of safely low dewpoint by delivering such supply of air preferably at one compartment surface and exhausting air from an opposite surface at all levels within the compartment. Such positive ventilation required a supply fan, for example, of between 4,000 to 8,000 c.f.m. capacity, depending upon the hold or compartment size, and usually an exhaust fan of the same capacity at the opposite surface. A typical hold size is 60′ x 60′ x 40′.

(2) *Recirculation.*—When the dewpoint of the weather air is relatively high or when it is impossible to use weather air due to heavy seas or rainy or snowy conditions, it is undesirable or impossible, to ventilate the hold with such weather air. Under these circumstances, the prior art practice employed damper changes in the deckhouse containing the fans so that the supply air would be taken from an upper level of the compartment or hold and delivered as before to lower deck levels. At the same time exhaust fans would, by a similar damper change gather and direct this air to the upper deck level instead of overboard. This produced what has been termed "recirculation" within the hold which virtually made the upper levels a return duct by reversing the previous direction of air flow in the upper deck levels without changing the direction of the air flow in the lower levels.

(3) *Dehumidification with ventilation and/or recirculation.*—In addition there was a provision for introducing dehumidified air from an outside source into the supply streams in either of the above procedures (1) or (2) thus reducing the resultant dewpoint within the hold by displacement. Exhaust means were provided to permit venting of the air displaced by the drier air from the outside source. Note that this drier air was dehumidified weather air.

Under prior practice the weather air was selected to be the source of air to be dehumidified as it was suitable to prevent ship-sweat though not, as it has now developed, to prevent cargo-sweat. Research had established that a 77° dewpoint (140 grains of water per pound of dry air) of weather air was the highest mean value found at sea or in most coastal ports and lower than dewpoint temperatures which can develop in holds carrying cargoes of unknown and unmeasured high moisture content such as raw hides, green timber and new crop grain. This being a known useable maximum, the prior art systems were designed to have enough drying capacity always to maintain a desired differential between the maximum 77° F. dewpoint of weather air and that of the air in the hold at the bounding surfaces. This was accomplished. There was then no seagoing measurement of moisture evolvement from the various cargoes such as coffee, tobacco, timber, etc., to show what was in fact the moisture load given off by a mixed hygroscopic cargo during a voyage from say the tropics to a temperature zone or vice versa. The variable conditions persented a problem unanswerable by the prior art.

Such prior art practice required a central dehumidifying plant for producing air for distribution to the various holds. From practical economic reasons all then known forms of dehumidifiers in relatively small capacity units were very heavy, bulky and had high power consumption in terms of power per pound of water per hour removed from the air. However, dehumidifiers in relatively larger capacities can dehumidify with a much lower ratio of cost, weight required, power consumed, and cubic volume occupied, per pound of water removed per hour from the air. Also, such machinery of prior art required substantial volumes of steam for reactivation, large traps and piping for the removal of condensate, and also salt water for aftercooling, so that the large air ducts going to the holds would not be overheated where passing through living, operating or cargo spaces. In a ship, the sources of steam, electrical energy, and cooling water pumping are naturally centered in the engine room area which is where such prior art dehumidifying systems have been located in the past.

Under such inadequate prior art practice cargo-sweat, particularly on canned goods, eventually became chronic and then intolerable. In view of this we have determined that the aforementioned practices of the prior art are fundamentally in error with respect to cargo-sweat. This has been supported by experiment and by careful analysis of conditions during actual sea voyages, which analysis has demonstrated the dramatic discovery that diffusion (migration of moisture particles) from the air surrounding a parcel of cargo, for example within one of the aforementioned storage vans which in turn is within a hold, does not have enough motive power due to vapor pressure difference to reduce the dewpoint appreciably in such a van even though there is an enormously large difference in dewpoint inside the van as compared to the dewpoint of the air in the hold but outside the van. A large difference in dewpoint produces an exponentially larger difference in moisture content. Vapor pressure, which is linear with moisture content, doubles with a 20° F. increase and quadruples with a 40° F. increase in dewpoint.

Our experience and analysis have established the necessity for vigorous circulation through such vans and similarly through the holds in which general cargo is stowed or in the same sense through and over the surfaces of the parcels of cargo wherever it is stowed so that to combat either ship-sweat or van-sweat the vapor laden air is replaced by drier air, or also to combat cargo-sweat, additional heat can be carried into and applied to the cargo, thus safely tempering same during the voyage by maintaining a low dewpoint by dehumidification throughout such voyage.

The aforementioned vigorous circulation through the vans accomplishes by a moving dry air stream a scouring of the largely saturated lamina of air immediately surrounding the surfaces of the cargo especially in cargo-sweat, and it is this scouring or sweeping action of the air thereover which creates conditions producing the necessary moisture migration rate, or alternatively expressed, such scouring or sweeping creates a condition whereby diffusion of moisture from a parcel of cargo acquires adequate motive power to reduce the dewpoint in the container attributed to cargo moisture to a degree preventing cargo-sweat or even van-sweat, even though to anyone ordinarily skilled in the art there was theoretically the aforementioned large enough difference of dewpoint temperatures inside and outside the van. Such differential was, as above discussed, found to be ineffective in reducing the interior dewpoint to a level low enough to prevent sweat damage.

The prior art thus teaches the aforementioned ventilation by natural supply and exhaust of air or, alternatively, a mechanical supply of the air as by a power driven fan or by the relative motion of the vessel and the air. Furthermore, the prior art teaches the use not only of the aforementioned mechanical supply of air during ventilation, but also a mechanical or power driven exhaust for such ventilation. Furthermore, the recirculation set forth above can be supplemented by dehumidification for sweat prevention, the prior art teaching use of outside or weather air which is drawn into the system, dried and supplied to the storage compartments for prevention of ship-sweat.

However, with respect to cargo-sweat, particularly for steel and canned goods cargo, such goods warm relatively slowly during fast voyages, and often arrive at the point of discharge at a lower temperature than the local dewpoint. Consequently, sweating under these circumstances begins after the discharge of the cargo even though it might not have accumulated sweat during the voyage. As a result, heating or tempering of the cargo is indicated. While tempering the cargo, the dewpoint of the air in contact with the cargo must be kept lower than the cargo temperature. This requires dehumidification to maintain initial dewpoints and to remove moisture infiltrating from the atmosphere or evolved from the cargo itself or the casing material surrounding the cargo, for example, box shooks or box cardboard or dunnage within the hold, all of which, though designed to protect the cargo, will give off damaging moisture while these materials are heated above their equilibrium temperatures during the aforementioned tempering operation. The dewpoint of the air within a case of canned goods is often greater during heating than the dewpoint of the air in the hold. Slow diffusion produces a cargo-sweat condition.

After recognizing the above heretofore unknown problems we have experimented to solve them and have made the aforementioned unexpected discovery. Such experiments have been conducted at sea and in the laboratory and have demonstrated that the prior art apparatus and methods which dried the outside or weather air, while suitable for prevention of ship-sweat, are not suitable for or capable of the prevention of cargo-sweat.

In this connection, the following factors are to be considered:

(*a*) The cargo warms up slowly in some areas;

(*b*) As the ship approaches the tropics, the air temperature and the dewpoint temperature rise but the moisture content of the air increases much more rapidly;

(*c*) The moisture content of the air more than doubles with every 20° F. rise in dewpoint temperature, therefore, at an exponential rate.

(*d*) All dehumidifying devices lose efficiency as the air temperature increases; and (*e*) Moisture vapor disseminates or migrates beyond a relatively thin lamina of less than nine millimeters surprisingly slowly by diffusion alone and this requires forced air movement to maintain a low dewpoint temperature.

The factors (*a*) to (*d*) all combine to resist the maintenance of low dewpoint temperature conditions in a storage compartment as the ship approaches a climate where such condition is most needed. This is especially aggravated when outside air is employed as the source of air which is dried and introduced into the storage compartment.

The aforementioned has been dramatically demonstrated by the graphs of conditions during actual voyages to be described more fully hereinafter.

We have demonstrated the need to dehumidify the air in the hold by the recirculation and cumulative drying thereof without introducing outside air (except when such outside air is significantly drier than the hold air). Thus we avoid the drying of moisture-laden air taken from outside which would make it necessary to work on an ever increasing dewpoint of such outside air as caused, for example, by storms or when approaching the tropics. Also, we have demonstrated that the cargo must be heated sufficiently rapidly so that when it arrives at its port of discharge, it will be at a temperature above the weather dewpoint temperature of its discharge destination.

We have demonstrated that the ship-sweat problem is aggravated in the aforementioned vans, either within holds or not. We have shown that it is useless to rely on normal or natural diffusion (unaided or natural moisture migration) to move at a useful rate moist air into surrounding outside low dewpoint temperature atmosphere.

Thus the aforementioned significant discovery includes inter alia the following:

Although a particular van located in a hold is provided with a substantial area of port openings, for example, two square feet on each opposite end thereof, such natural diffusion alone is not enough to bring the van dewpoint temperature down to anywhere near the hold dewpoint temperature. In fact, the van dewpoint temperature can become so high that the van in the hold will be subjected to sweating, for example, if it should be exposed to weather air by opening the hatches of the ship where the weather temperature may lower the skin temperature of the van to a point below the dewpoint temperature of the air within the van, or alternatively, where the van may be put ashore where the dry bulb temperature of the weather is or may subsequently be substantially lower than the dewpoint temperature of the air within the van. One of the principal discoveries embodying the present invention is illustrated by the result attained by putting an air blower (with or without the application of heat to the blown air) at one of such ports in the van. Illustrating the present invention this was done, for example, for 18 hours whereupon the dewpoint temperature dropped abruptly 20° F. in the first 15 minutes and thereafter continued to drop but at a lesser gradient until the blower was shut off. The dewpoint temperature in such van, after the shutting off of the blower, increased 18° F. almost in a vertical slope and this in the first 15 minutes after such shutdown of the blower. Such dewpoint temperature of the van continued to rise even after such 15-minute period toward the temperature gradient as extended. The crucial factor of the discovery was not the quick drop per se of the dewpoint temperature, but rather the quick attainment of the lower dewpoint by means of the blower. This demonstrates that the prevention of van-sweat or ship-sweat requires vigorous air movement or scouring action to carry away the moist air and replace it with safe dehumidified air.

This discovery and the methods and apparatus embodying same are contrary to the doctrine of the prior art, particularly with respect to cargo-sweat, the new discovery involving the dehumidification of the air from the hold (which gets progressively drier), rather than the weather air which gets progressively wetter (as, for example, when a tropical or warm climate is approached) precisely when the driest air is required.

There may be employed advantageously but not mandatorily in the system of apparatus embodying the present invention dehumidifier apparatus in accordance with U.S. Patent 2,700,537 to Manters.

Such dehumidifier apparatus embodying the aforementioned inventions aid in the decentralization of the system for the dehumidifying of the several holds, that is, to decentralize same as compared to the prior art.

Thus in accordance with such decentralizing of the system, instead of a single central dehumidification plant (located in the engine room) taking its air to be dried from the outside or weather air and supplying the dried air to each hold of the ship, the system embodying one form of the present invention employs a plurality of separate or individual dehumidifiers, each located in or near its respective hold, the air of which it is to treat. Air to be dried is taken from such hold during a period of wet weather, is dried and is returned to the hold. Cumulative drying is thus accomplished because the same air passes through the dehumidifier again and again, residual water vapor being reduced during each pass. Of course, during periods when the dewpoint of the weather air is lower than the dewpoint in the hold, the weather air itself may be dried further and passed into the hold, or sometimes used directly without dehumidification.

Thus we have concluded the following:

For prevention of ship-sweat and van-sweat:

(*a*) Forced air movement is required to carry away high dewpoint air because the aforementioned diffusion has little effective motive force even though a large vapor pressure difference exists between the inside and the outside of a van, or between various zones within a hold.

(*b*) Dehumidification is required.

For prevention of cargo-sweat:

(*a*) Forced air movement is necessary to carry off the moisture which is liberated, for example, from damp portions of the cargo, such as parcels of timber and bagged products or such as damp cardboard cartons, for the purpose of preventing the moisture therein from migrating inwardly onto the surface of the cargo, for example, labeled cans, which might be loaded and remain colder than the subsequent dewpoint temperature (occurring days later) of the thin layer of air which then immediately surrounds such cold surface. The aforementioned forced aid movement which passes over the cargo removes vapor both by physical force of the dry air stream and also by virtue of a vapor pressure difference between the air of such stream and the portion of the cargo containing moisture. Also, forced air movement is required as a vehicle to carry heat to the cold cargo to warm it above the dewpoint temperature of the weather at the port of discharge.

(*b*) Dehumidification is necessary to prevent cargo-sweat while tempering because the raising of the temperature of the cargo raises the vapor pressure in hygroscopic or water bearing materials in the hold which causes vapor or moisture to be released into the air of the hold, thus raising the dewpoint temperature of the air immediately surrounding the cargo at a faster rate than the increase of cargo temperature. Whenever the dewpoint temperature exceeds the cargo temperature cargo-sweat forms.

(*c*) In one form of the invention it is necessary to dehumidify only the air in the cargo hold rather than to dehumidify the outside or weather air and then introduce it into the hold or van.

The invention, in one aspect thereof, comprises a novel method for preventing damage to cargo in a van which is within a hold and which van is provided with inlet and outlet ports, for example, on opposite sides or ends thereof, the method comprising the following steps:

Closing the hold to the outside or weather atmosphere; recirculating the air in such hold while cumulatively drying same and maintaining its dewpoint temperature well below the dry bulb temperature of the cargo, the dry bulb temperature of the van surfaces, and the dewpoint temperature of the air in the van; then blowing such hold air in a moving stream into the van via an inlet port while directing such stream to scour the air lamina directly adjacent and surrounding the external and internal exposed surfaces of the cargo in the van; such blowing and directing of the air stream bringing the velocity thereof to a value adequate to sweep away and out such outlet port the moisture bearing lamina of air surrounding moisture bearing parts of the cargo (for example, coffee beans, hides, or cardboard boxes) thereby preventing the moisture in such lamina from substantially increasing the dewpoint temperature of such atmosphere to a point where it is above the dry bulb temperature of the van surfaces, and also preventing the moisture in such lamina from migrating into the air immediately adjacent and within parts of the cargo (for example, labeled cans) which may be then at a lower dry bulb temperature than the then dewpoint of such air and therefore forming damaging condensation; such moving air stream also drying the atmosphere in the van to a dewpoint temperature below the dry bulb temperature of the van surfaces; such forceful scouring or sweeping away of such moisture-bearing lamina thus providing the necessary moisture migration rate which in the unforced or natural condition would result in cargo damage, either by sweat forming on the cargo per se, or cargo damage by condensation forming on the interior surfaces of the van and thence contacting the cargo (as by dripping from the roof) and damaging same.

Heat can be applied to the air during such recirculation for the purpose of warming the cargo to insure that it will be warmer than the dewpoint temperature of the atmosphere when the cargo is removed from the hold or when the hold is opened without cargo removal.

The above and further objects and novel features of the present invention will be apparent from the description set forth below when read with the accompanying drawings, the latter being for purposes of illustration only and not defining the limits to the invention, reference for this latter purpose being had to the appended claims.

Figures 28, 29:
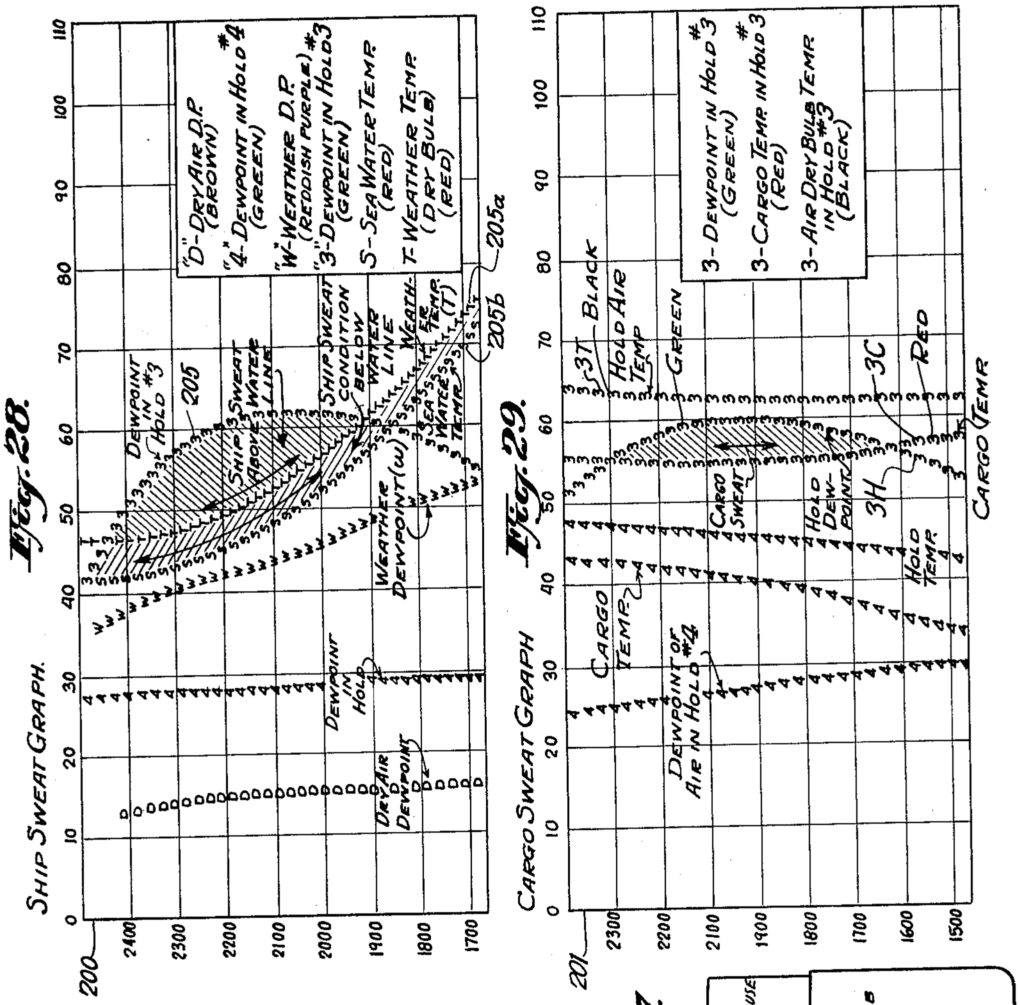

FIG. 28 comprises a graph showing a portion of a movable tape or recording of several dewpoint and dry bulb temperatures which are sensed in carrying out a method with respect to the prevention of ship-sweat, such temperatures being plotted against time;

FIG. 29 also comprises a graph showing a portion of a movable tape or recording indicating the several temperatures plotted against time which are considered with respect to the prevention of cargo-sweat.

Figure 1:
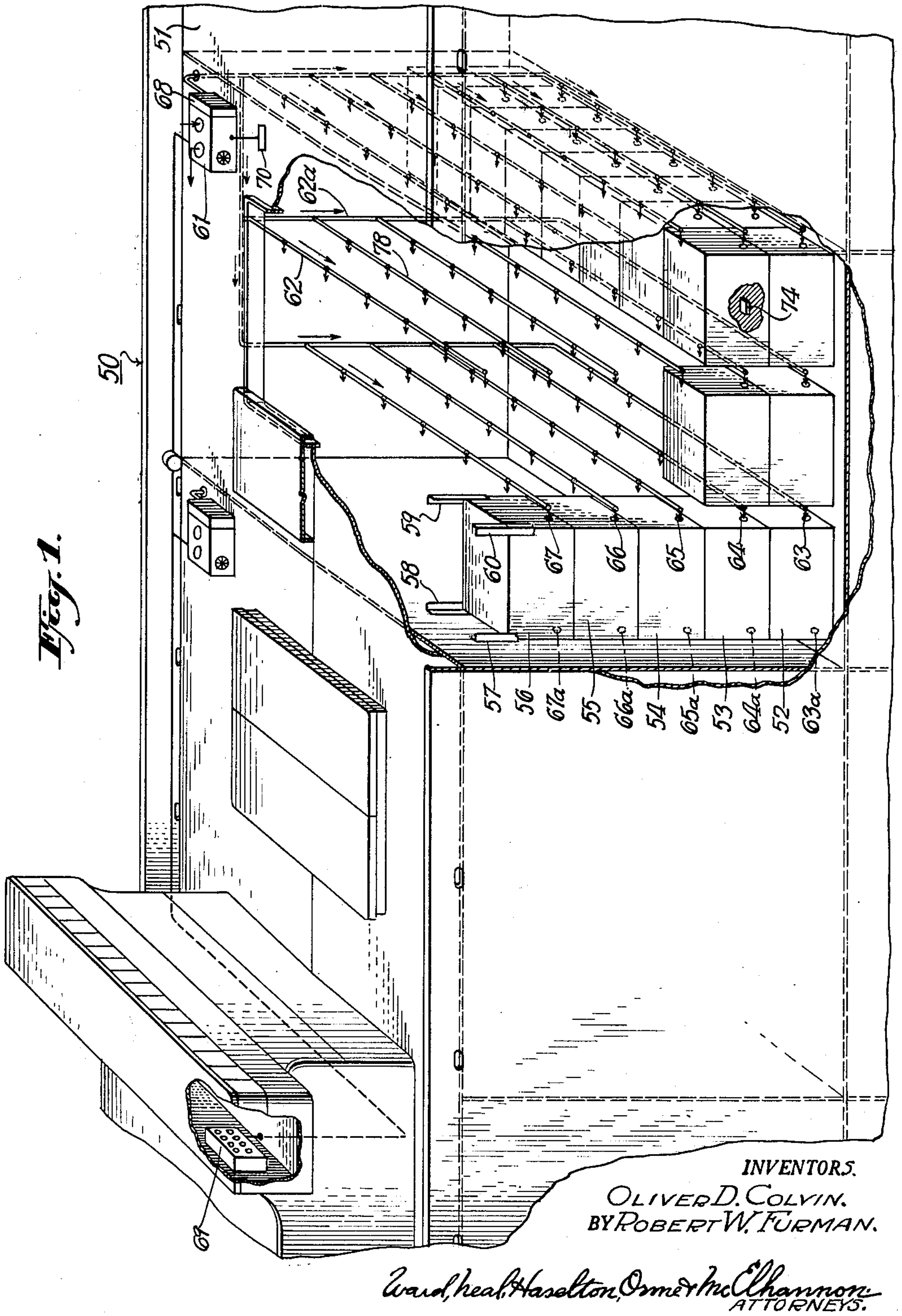
FIG. 1 is a perspective view, partly in section and with parts broken away, of a ship embodying one form of the system of the present invention.

Referring to the drawings, and in particular to FIG. 1, there is shown one form of the system embodying the present invention and comprising a portion of a ship which is especially adapted for receiving in the hold thereof containers or vans in stacked relation. Such a ship is referred to in the art as a "container ship" or "van ship." Each of such vans or containers comprises a separate, individual, or integral container. Such ship is designated at 50 and is provided with a hold 51 which is designed for receiving a plurality of such vans in stacked relation, the lowermost one in the lower lefthand corner of such hold being designated 52 and resting on the lowermost deck surface thereof, and there being stacked or superposed thereabove identical vans 53–56, inclusive. The dimensions of such a van, for example, are 8′ x 8′ x 17′.

Each individual van is lowered into the hold 51 with the aid of four guide rails, one at each corner thereof, one set of such rails being indicated in FIG. 1 at 57, 58, 59 and 60 for the aforementioned stack 52–56, inclusive.

Reverting to the experiments and operating experience on which this invention is based and which indicates the reason for the employment of the system of apparatus of FIGS. 1–6 which will be hereinafter described, there are the following important considerations to be borne in mind: There are two general classes of cargoes which have been damaged by moisture condensation or sweat while these cargoes are actually at sea inside of such vans. These two general classes are:

(*a*) *Hygroscopic cargoes.*—These cargoes release moisture which can condense on metallic surfaces within the van, for example, on the roof thereof as aforementioned. This condensate then drops from the overhead of the van onto the cargo (as per the performance of prior art systems) or it soaks the cargo which is in physical contact with such wet surfaces along the sides or ends or even the floors of the containers. This phenomenon is similar to ship-sweat and it occurs when the outside of the container is exposed to an atmosphere of a dry bulb temperature lower than the equilibrium dewpoint temperature of the cargo being carried within the van.

(*b*) *Canned goods and related metallic surface cargoes.*—It is known that if such cargoes are loaded at a port while they are relatively cold and are later exposed to an atmosphere where the dewpoint of the ambient air is higher than the then surface temperature of the cargo, condensation will form on the cargoes' metallic surface, thus comprising cargo-sweat which results in rust, wrinkled or discolored or detached labels, soggy cardboard cartons and the like damage. This is also true, for example, of machinery, automobiles, wrapped glass, and other commodities of high heat conductivity.

We have determined by experiments at sea aforementioned, which will be hereinafter discussed, and under actual operating conditions and by subsequent analysis of experimental data, that in both of the cases mentioned above, this ruinous condensation may be prevented by controlled circulation of dehumidified air through each cargo van by techniques herein specifically set forth. With respect to the prevention of cargo-sweat, it is also desirable to warm (temper) the cargo above the dewpoint temperature of the port of discharge so that it will keep dry after it is discharged from the ship. With respect to the prevention of van-sweat, it is also desirable to cool the hygroscopic cargo thus lowering the vapor pressure, hence, equilibrium dewpoint temperature of the air within the van. Such can be accomplished, for example, with a forced flow of dehumidified air having a low wet bulb temperature.

For the purpose of preventing sweat damage both to hygroscopic cargoes and those cargoes susceptible of cargo-sweat, we have provided a decentralized dehumidifier system, shown in the drawings, and which embraces the following five principal elements, particular reference being had to FIG. 1:

(1) A dehumidifier 61 of a size and capacity required to serve only a single separate hold, such as 51, for the vans and to produce a very low dewpoint in such hold. It comprises a small, light and inexpensive dehumidifier apparatus which is situated preferably outside the hold, as shown in FIG. 1. This dehumidifier should not and need not be located in the engine room spaces where it has normally been the practice to locate it heretofore. The single or separate dehumidifier apparatus is capable of dehumidifying the entire hold 51 which, for example, may be of dimensions 60 x 60 x 40 feet. The dehumidifier 61, by a system of ducts or pipes and nozzles broadly designated at 62, is operatively associated with the individual vans, such as 52–56, inclusive. A suitable fan or blower (not shown in FIG. 1) to be described more fully hereinafter and normally situated adjacent and considered a part of the dehumidifier 61, is employed, by means of which air is blown into each van via such pipe system 62. This blowing of the air into each van is accomplished via individual inlet ports, for example, 63–67, inclusive (FIG. 1), respectively formed in the vans 52–56. Air thus blown into each van exhausts therefrom via exhaust ports, such as **63*a*–67*a*, inclusive, for the same group of vans. The individual hold dehumidifier apparatus 61, in combination with such system of ducts and nozzles, is capable of quickly producing a very low dewpoint atmosphere in such hold and in each individual van. Such hold dehumidifier, in one form of the invention, may be constructed in accordance with the aforementioned Munters patent rights. However, the invention is not limited to the employment of this particular type of dehumidifier apparatus as described in such patent rights. The dehumidifier 61 produces the aforementioned low dewpoint atmosphere by drawing the air to be dehumidified from the hold 51 rather than from the outside or weather air, thereby cumulatively drying and producing rapidly a progressively lower dewpoint temperature in such hold. Suitable damper means employed with such blower or fan means permits ventilation of the hold 51** by means of such outside or weather air if this is indicated by ambient weather conditions, and such means for accomplishing this will be described more fully hereinafter. If such weather air is employed, it also may be dehumidified if needed.

(2) A heat exchanger 68, which is capable of warming the cargo in a controlled manner by passing the air which is directed to the vans through such heater or heat exchanger 68 so that those cargoes which are susceptible to cargo-sweat will be free from damage therefrom, this being true not only while they are aboard ship but also after they have been discharged from the ship and also from the van. Such cargo damage, of course, can occur if the cargo within the van is not suitably tempered so that its temperature is above the dewpoint temperature of the ambient air at the point of discharge of the cargo and the van.

Figures 2, 3:
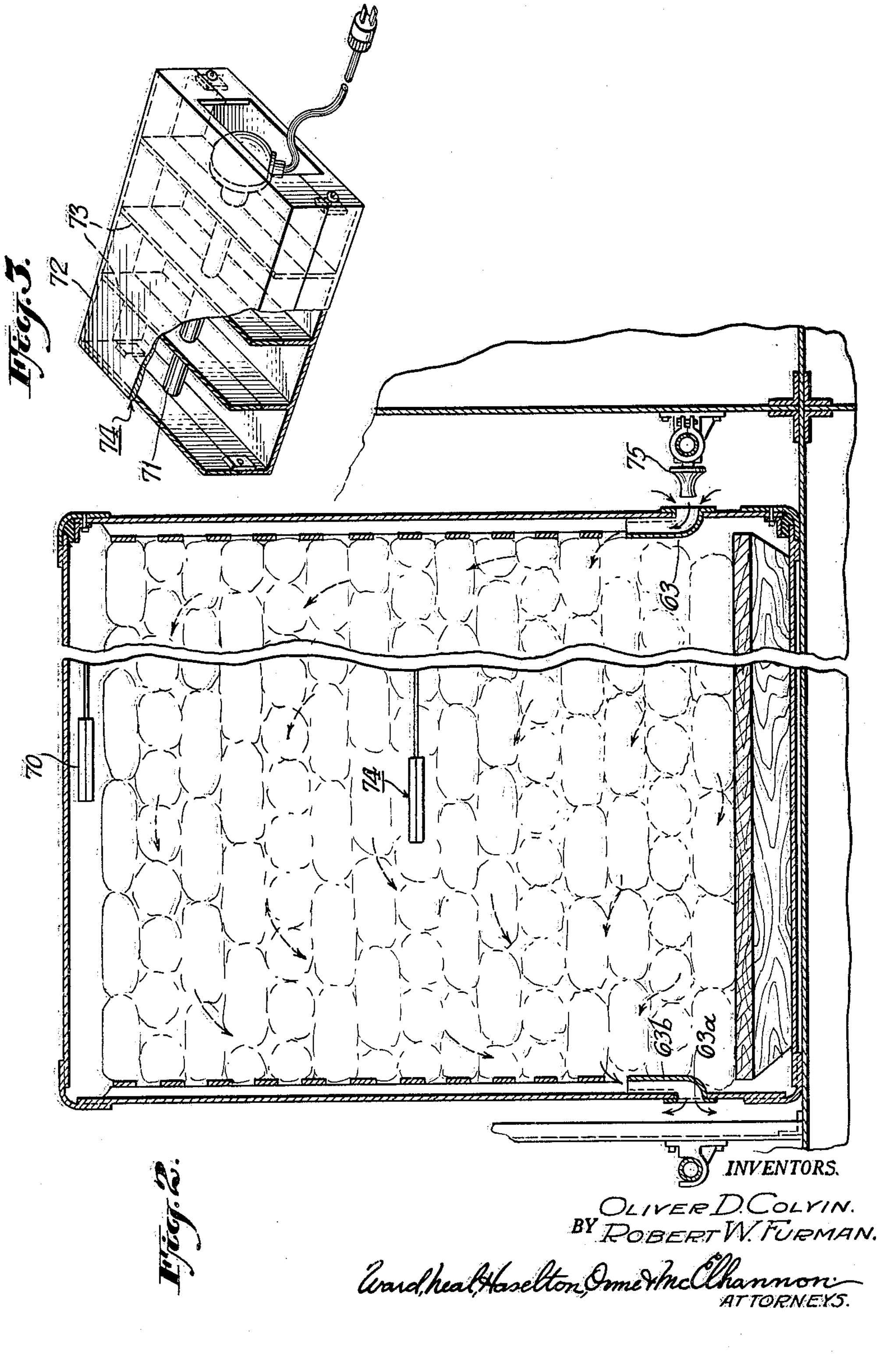
FIG. 2 is a vertical sectional view of an individual or integral cargo van which can be lowered into and stacked in substantial number in the hold of the vessel of FIG. 1.
FIG. 3 is a perspective view of a temperature sensing device employed in the storage van of FIG. 2.
Figure 6:
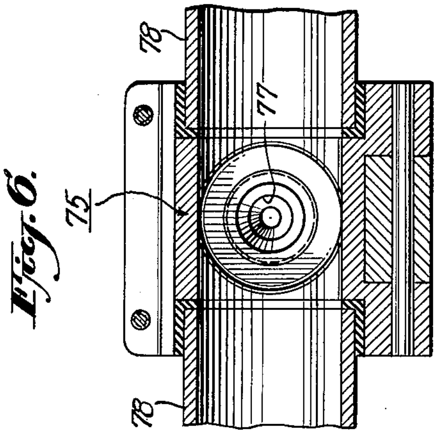
FIG. 6 is a sectional view taken substantially along line 6—6 of FIG. 5.

(3) A central control means 69 (FIGS. 1 and 26) is employed to govern the operation of the system, and in particular the dehumidifier 61 and the heat exchanger 68, so that these elements will operate in the most efficient manner. Such central control means preferably, but not necessarily, embodies the apparatus disclosed in the aforementioned U.S. Patent 2,822,743. One or more of such vans containing a representative cargo, preferably is provided with means for determining the dewpoint temperature within the van, for example, by means of a dewpoint temperature sensing means, known as a Dewcell, designated at 70 which is suitably connected, as by electrical interconnections, to the central control means 69. The Dewcell 70 may be outside the van but in the return air stream to the dehumidifier 61. Such central control means 69 is also sometimes referred to as the central control console. Referring to FIG. 3, a resistance bulb thermometer 71 is employed which is within a housing 72 and is provided with a plurality of thermal bridges 73 for the purpose of reading the average cargo dry bulb temperature. The housing 72, for example, is of aluminum and the entire assembly is generally designated by the numeral 74 and is referred to as a cargo temperature probe which performs a temperature averaging function. The cargo temperature probe also is operatively connected to the control console 69 by suitable means.

(4) Air distribution means, represented by the aforementioned conduit system 62 and also embracing the air injection nozzles 75 (FIG. 5) at least one of which is provided for each of the vans and which directs, by means of a nozzle construction to be defined more fully hereinafter, air into each inlet port in each van, for example, inlet port 63 (FIG. 1), such air escaping from the van via an exhaust port **63*a* (FIG. 1) which if desired may be internally shielded by a vertical open ended duct 63*b* (FIG. 2) connected thereto as shown. The principal purpose of such duct 63*b* is to prevent the entrance of snow, sleet or rain within the container should it be exposed to the weather. Thus the air recirculating in the vans and the hold 51 is distributed by means of a high pressure small diameter piping or duct system to the unique jet induction nozzles 75** by which air is blown at high velocity toward and into each van.

Figures 4, 5:
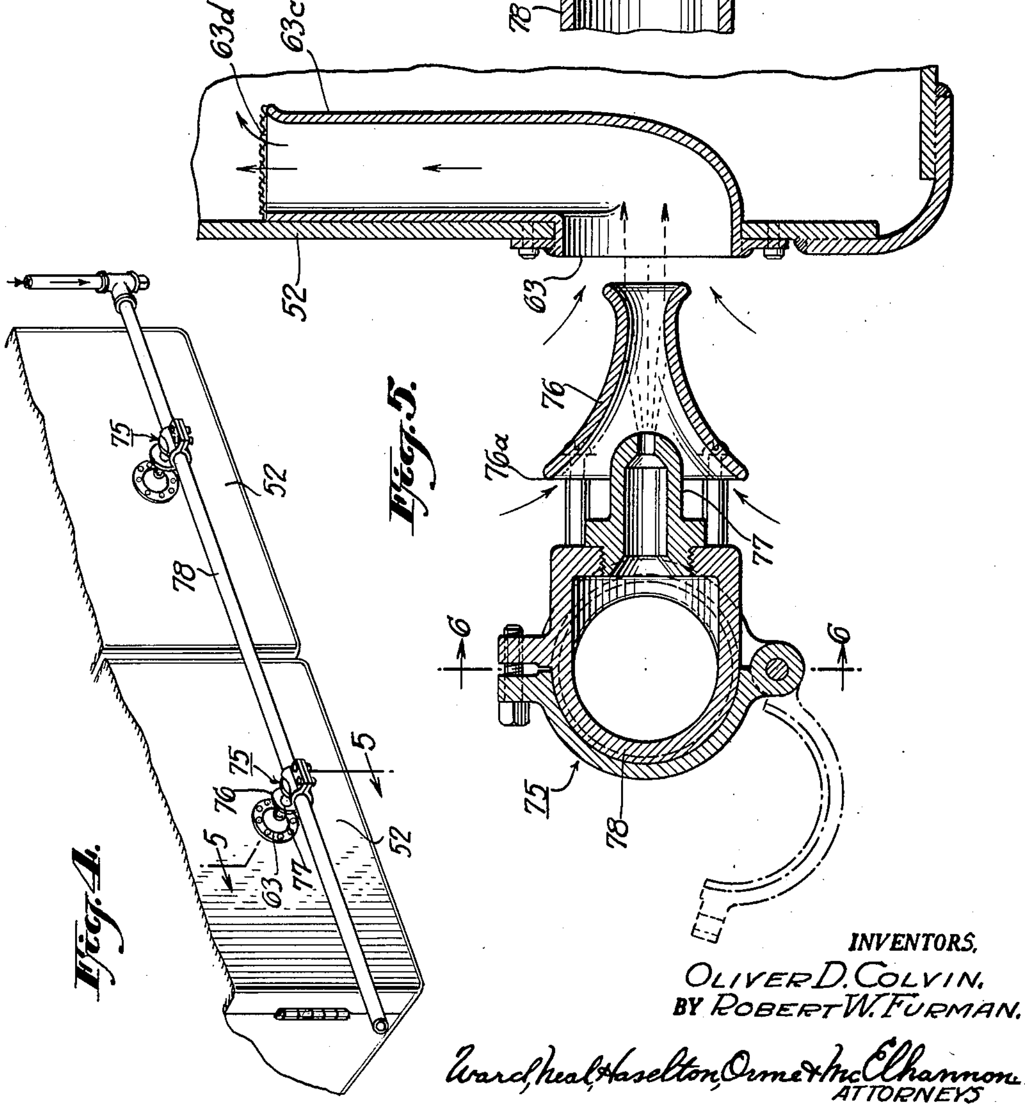
FIG. 4 is a perspective view of two such vans or storage compartments, the latter being fragmentarily shown in combination with a supply air duct and an air blower or nozzle system comprising a part of the present invention.
FIG. 5 is a sectional view taken substantially on line 5—5 of FIG. 4.

Each of the induction nozzles 75 in a preferred embodiment employs a Venturi type of throat or sleeve 76 which is held in spaced relationship to a main nozzle 77 and which sleeve is provided with a bell or outwardly flared inlet port **76*a* which is thus so situated, as shown in FIG. 5, to entrain air from the atmosphere within the hold and to inject same through the Venturi throat or sleeve 76 into the inlet port 63 of the van. This entrainment feature of the nozzle incorporating the Venturi throat thus enables it to draw several times as much air through the throat as is ejected via the nozzle 77**.

Figure 12:
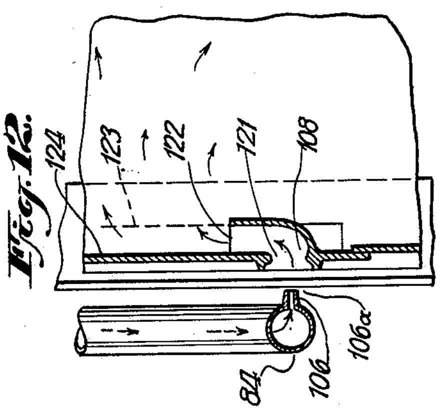
FIG. 12 is a vertical sectional view taken through the same nozzle shown in FIG. 11.

Alternatively, such Venturi throat 76, instead of being secured to and comprising a part of the piping system 62, may be entirely separate therefrom and may comprise an integral part of the van in a manner which will be described in connection with FIG. 12. Thus the Venturi throat may be mounted in the wall of the van as shown in such FIG. 12 thereby reducing the extent of the protuberance from the horizontal air duct which feeds air to the nozzle 77. The advantage of this latter construction is that it saves a substantial amount of space within the hold by permitting the van to be placed closer to the several ducts, such as the horizontal and vertical supply ducts, and also minimizes the danger of damage to the protruding nozzle construction, as shown in FIG. 5.

The nozzle 77 is connected to the aforementioned supply air duct which is designated at 78 in FIG. 5 and which is an integral part of the aforementioned duct system 62. The duct 78 may be aluminum.

Not only does the construction of FIG. 5 have the aforementioned advantage of permitting the Venturi type of throat to draw several times as much air through the throat as ejected through the nozzle 77, but this feature permits the diameter of the distribution duct system from the source of supply to each van to be greatly reduced as compared to the diameter which would be required to handle the total volume of air which must circulate through each van in order to achieve the objectives of the present invention. The aspirating or air entrainment feature greatly reduces both the size and the weight of the duct system 62.

(5) Each van is fitted with two or more of the aforementioned ports, such as inlet port 63 and exhaust port 63*a*, which allows the jet of air from each nozzle 75 to enter the van at one end and for air to exhaust from the other end. These ports are designed to spread the air for efficient interior distribution within the van or container and also to prevent the entrance of sea water or rain water should the van be stowed on deck rather than within the protection of the hold or should the van be on a dockside or when in transit on land by truck or railway car. Thus each port, such as 63, to this end may include in combination therewith a short tube length 63*c* (FIG. 5) which preferably is directed upwardly from the port 63 proper, the tube 63*c* having an outlet port at 63*d* which is well above the inlet port. Tube 63*b* (FIG. 2) aforementioned is for the same purpose. There is thus directed into and circulated in the vans initially high pressure air which may be dehumidified or not. Also it may be heated or not. The tempering or heating will be started, if indicated by the relatively lower dry bulb temperature of the cargo with respect to the ambient dewpoint temperature of its future port of discharge, for the purpose of warming the cargo so that it will be warmer in dry bulb temperature than the dewpoint temperature of such port of discharge.

The placing of instruments, such as the Dewcell 70 and the resistance bulb thermometer 71, 74 (FIGS. 1 and 3), in representative vans and cargoes enables the forecasting of proper control measures with the aid of the central control means 69 as will be explained more fully hereinafter.

The shielded resistance bulb thermometer 74 (FIG. 3) enables an average sampling of the temperature of a large area of the cargo itself by means of its aluminum contact area and the plurality of thermal bridges 73, with a minimum effect from the temperature of air streams.

The directing of the high pressure relatively high velocity air into each van diffuses and spreads the air within the van thereby scouring the lamina of air directly adjacent the cargo and/or the van surfaces and spreading the air for most efficient distribution therein.

As aforementioned, we have discovered the reluctance of large volumes of air to be wetted by a small surface of water or any wet substance. That is, the evaporation or migration of moisture from a wet substance is very slow through still air. Conversely, where a wet substance is in a partial vacuum, the rate of diffusion is relatively larger.

Thus it is possible to have a selected vapor pressure differential between a wet substance and the ambient atmosphere and if the latter is under a vacuum the water will evaporate promptly whereas if there is a normal atmospheric pressure, there will be the aforementioned large reluctance for the whole volume of the air to be wetted by the wet substance in the absence of convection or forced circulation.

Thus, particularly regarding the problem of cargo-sweat, the rate of diffusion into the air lamina which is directly adjacent to a wet body, for example, the first nine millimeters, is relatively large but the particles of moisture (in the absence of forced air flow thereover) apparently migrate beyond this lamina at a surprisingly diminished rate. This reluctance of migration is overcome in the present invention by the aforementioned forced circulation creating the displacing or scouring action which occurs by the running of the fan or blower which directs the air into the container in the manner mentioned above.

Thus if the aforementioned lamina is scoured by a moving air stream and is replaced continuously by fresh air which is non-saturated and of adequately low dewpoint and thus able to take on moisture, then the rate of diffusion from the wet substance increases very greatly, this being a measurable quantity. This is why a circulation of non-saturated air is desirable within and through the vans and adjacent the surface of the cargo or the structure of the van or any condensing surface on which it is desired to avoid sweating.

With respect to one form of the system embodying the present invention there is an effective local or decentralized drying of each of the holds, such as 51, as opposed to the system heretofore employed in the prior art, namely, the centralized plant dehumidifying weather air and distributing such air to many holds or many compartments, resulting in a quality of dehumidified air varying with the dewpoint or moisture content of the weather air, and resulting in the wettest air from the dehumidifier precisely when the driest air is needed.

Any small but effective dehumidifying unit, such as 61, which can accomplish the result may be employed and to save cargo space is preferably located topside in a small suitable deckhouse above the pertinent hold whose air it is to treat.

The effect of localized or decentralized dehumidifying of each hold by means of its individual dehumidifying unit, such as 61, is to accomplish the aforementioned cumulative drying by working consecutively on the same increments of air which are forced into the local dehumidifier unit, therein dried and thereafter forced back into the hold and recirculated there. Eventually the cycle repeats and the same increment comes back to the drier or dehumidifier 61 perhaps having picked up additional moisture but nevertheless drier than it was when it was first acted on by such dehumidifier. This repetition of the cycle embodies the aforementioned cumulative drying concept which is employed in the present invention. In such invention we begin by drying a part of the recirculating air so that the rate of reduction of moisture in the air of the hold is the same though total air is recirculated at a much greater rate. More scouring or displacement and replacement is provided for the same water removal capacity. Therefore, a less expensive and smaller drier is sufficient, this being a significant characteristic of the invention.

By means of the present invention, there can be effected at the outset a rapid drying or a quick drop in the dewpoint temperature of the van air and a recirculation of such air over the entire cargo within each van. This, plus the scouring of the surfaces of the cargo to replace continuously the wet lamina of air directly adjacent thereto, results in such rapid reduction of dewpoint at the outset in each van in a manner which will be explained more fully herebelow. It also results in a continuance of such low dewpoint temperature.

Reverting to FIG. 1, it will be noted that the duct system 62 is provided with vertical manifolds or pipes such as 62*a* and horizontal air ducts such as 78, the latter being shown in cross-section in FIG. 5, and also shown in FIG. 4 as the horizontal duct to which are attached the plurality of nozzles 75.

Figures 7, 8, 9:
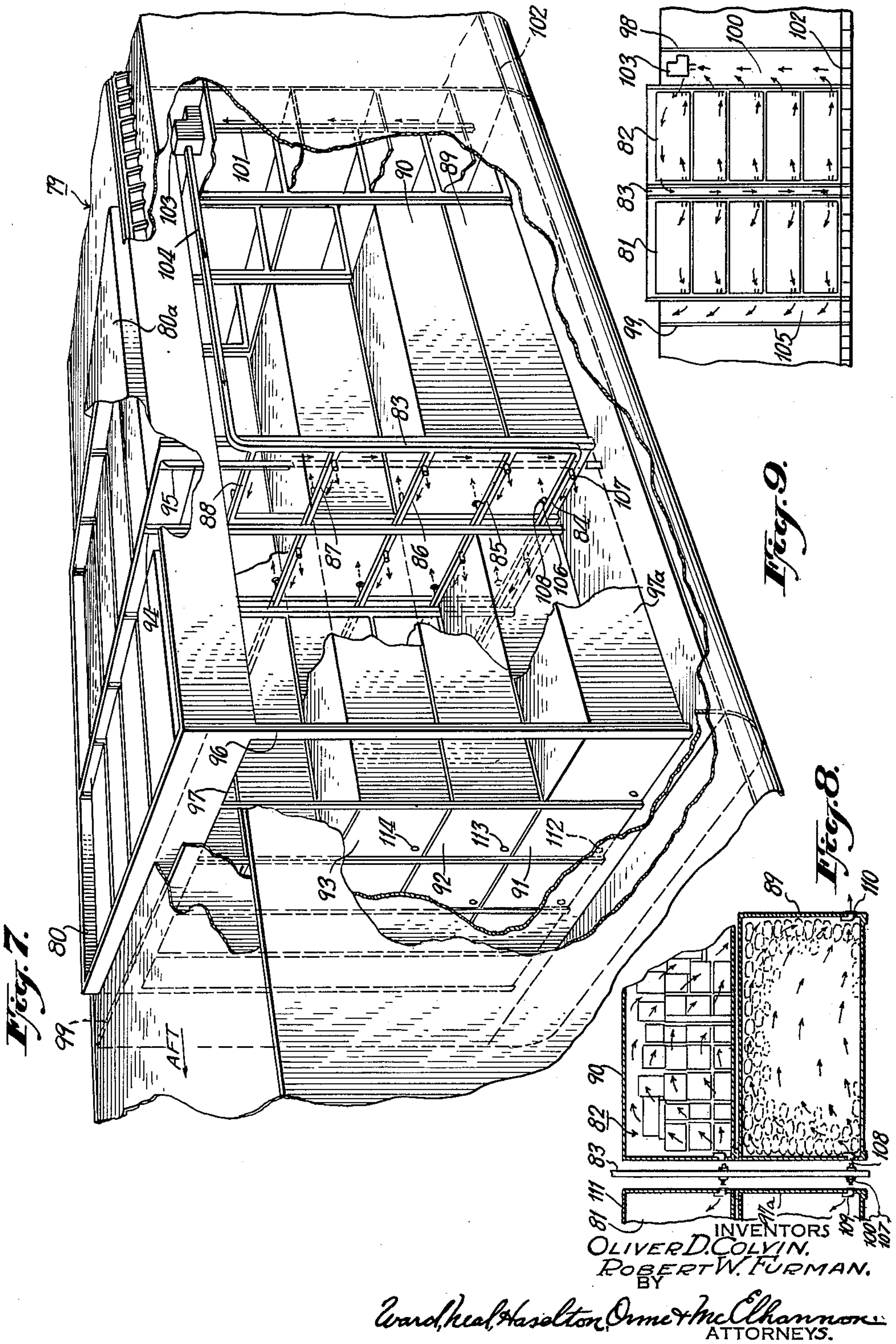
FIG. 7 is a perspective view, partly in section and with parts broken away of a hold of a ship somewhat similar to that shown in FIG. 1 and illustrating the plurality of vans which are stacked within the hold in combination with a supply air manifold system.
FIG. 8 is a vertical sectional view taken through several of the storage vans of FIG. 7 and illustrating typical cargoes carried therein and the circulation of an air stream therethrough.
FIG. 9 is a longitudinal sectional view of the hold shown in FIG. 7.

Referring now to FIGS. 7, 8 and 9 there is shown a representation of a ship 79 having a hold 80 in which a plurality of stacks of vans are stowed and which arrangement of vans and supply duct system is somewhat similar to that shown in FIG. 1 with the exception that for a typical pair of stacks of such vans, such as stacks 81, 82 (FIG. 9) there is employed a common vertical supply air duct 83 which, in the form shown, is located for example on the starboard side adjacent the skin of the ship and to which are connected a plurality of horizontal supply air ducts such as 84–88 inclusive. The latter are analogous to the aforementioned horizontal supply air duct 78 (FIG. 4) with the exception that each supply air duct such as 84 is provided with nozzles which are directed forward for those vans forward thereof and a plurality of nozzles directed aft for those vans which are situated aft thereof. By way of example a pair of vans 89 and 90 are situated forward of the supply air ducts such as 84–85 and the groups of vans 91–93 inclusive are situated aft of them.

A typical set of guide rails is shown at 94–97 inclusive for a stack of vans the lowermost one of which is indicated at **97*a*** in FIG. 7.

For the purpose of facilitating the recirculation of the hold air the two stacks 81 and 82 are situated as shown in FIG. 9 substantially centrally located between the bulkheads 98 and 99, the former being the forward of the two. Thus a space 100 is provided between the forward surfaces of the stack 82 and the bulkhead 98 and in which if desired may be located a vertical riser or duct 101 (FIG. 7) which extends substantially to the lowermost level of the hold and which draws air from adjacent the surface 102 and from each van outlet level to a fan and dehumidifier unit 103 wherein the air is treated in a manner which will be discussed, for example, in connection with FIG. 21 thence the air is directed outwardly via a horizontal duct 104 which in turn is connected to the aforementioned vertical supply air duct 83.

Air which exhausts from all of the containers of the stack 82 is sucked into the aforementioned space 100, which is forward of the two spaces, whereas air which is exhausted from the after exhaust ports of the vans of the stack 81 is sucked into a vertical space 105 (FIG. 9) which is situated between the aftermost surfaces of the van stack 81 and the bulkhead 99, and through which the air rises freely within the hold to the upper surfaces thereof.

The aforementioned hold 80 is provided with a hatch cover **80*a* (FIG. 7) which when in position closes the hold 80** from the outside weather.

The relationship of the vertical supply air duct 83 and the van stacks 81 and 82 is further illustrated in FIG. 8 in somewhat greater detail indicating the central disposition of such duct 83 between the stacks 81 and 82 and also the relative positions of the inlet ports for each of the vans and the air jet nozzles which are connected to the duct 83 and its various horizontal duct connections. Thus a nozzle 106 is provided which is connected to the horizontal duct 84 for directing air into the van 89 and a nozzle 107 is provided connected to the same duct for directing air into the after van 97. The nozzle 106 directs air into the van 89 via an inlet port 108 (FIGS. 7 and 8) whereas the nozzle 107 directs air into the van **97*a* via inlet port 109 (FIG. 8). These inlet ports are located preferably as shown in FIG. 8 near the lower surface or botttom of each van. Also the respective outlet ports, such as 110 for van 89**, are similarly located near the bottom of the van.

An analogous arrangement of nozzles and inlets exists with respect to container 90 which is above the container 89 and also the van 111 (FIG. 8) which is situated on top of the van **97*a***.

The cargo which is stowed within the van 89 consists for example of bags of green coffee beans, whereas the cargo in the van 90 consists for example of boxes of corrugated cardboard in which there may be contained canned goods bearing paper labels. The relative "tightness" or permeability of each "stow" of cargo within the vans 89 and 90 is illustrated in FIG. 8 indicating schematically that the air which is continuously forced into the inlet ports for each thereof is capable of passing around and through the stow, to a degree which is a function of such permeability, thereby performing the aforementioned scouring action over the lamina of air directly adjacent each increment of cargo, such as a bag of coffee or a corrugated cardboard box of canned goods.

Referring to the vans 91–93 inclusive, their respective exhaust ports are designated by the numerals 112–114 inclusive.

By means of the system shown in FIGS. 7, 8 and 9 a minimum amount of ducting is required and a maximum of ventilation is attained under circumstances embodying the present invention. That is where due to the fullness of the ship shape compared to the block shape of the vans, and the spaces between the vans, ample return air passage is afforded. There is required only the vertical riser spaces 100 and 105 together with the horizontal duct 104 connected to the dehumidifier blower unit 103, and the single vertical supply air manifold 83 on one side of the vessel, plus the several horizontal ducts connected thereto, namely 84–88 inclusive.

Figures 10, 13:
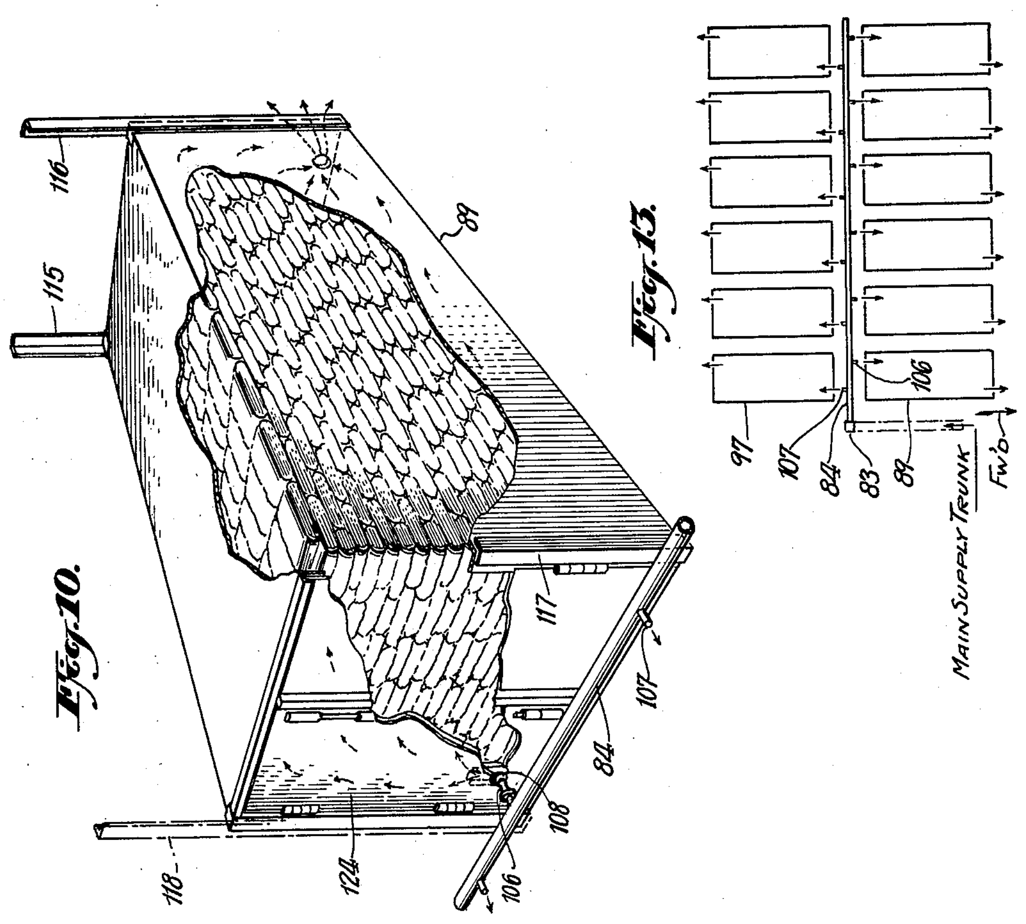
FIG. 10 is a perspective view, partly in section and with parts broken away, of one of the storage vans of FIG. 7 and illustrating in greater detail the relative positions of the supply air duct and the guide rails which hold same in position while stacked in the hold.
FIG. 13 is a diagrammatic plan view showing a typical air supply system on one level in a van hold embodying one form of the present invention.

Referring now to FIGS. 10–13, there are shown certain details of the construction shown in FIGS. 7–9 inclusive. For example, there is shown in FIG. 10 the van 89 partly in section and with parts broken away to illustrate the cargo of, for example, bags which may be filled with coffee. The van 89 is held in place upon the lowermost deck 102 of the vessel 79 by means of guide rails 115–118 inclusive. Furthermore, there is shown in FIG. 10 the relative locations of the jet nozzles 106 and 107 which are connected to the horizontal supply air duct 84.

In lieu of the jet air entrainment nozzle of FIG. 5, which may be employed in one form of the invention, there is employed in the form shown in FIGS. 10–13 a modification of the jet nozzle which has been preliminarily mentioned above and in which the Venturi or throat member 76 of FIG. 5 instead of being attached to the nozzle per se comprises a portion of the van. Thus in FIG. 12 the horizontal supply duct 84 is provided with the fixed nozzle 106 which is positioned to be in register with an inlet port 108 of, for example, the van 89, which inlet port 108 is somewhat spaced from the outlet or extremity **106*a* of the nozzle 106 and is in communication with a restricted or Venturi portion 121 comprising preferably a vertically disposed tube having the inlet port 108 at the lower extremity thereof, and also having an outlet at 122 at the uppermost extremity thereof. Above the outlet 122 the tube 121 is in communication with the interior of the van 89 via a grill 123 which if desired may extend from the outlet 122 throughout a selected area of the aftermost portion of the van 89** to assist in the distribution of the air throughout the stow of cargo within the van.

Figure 11:
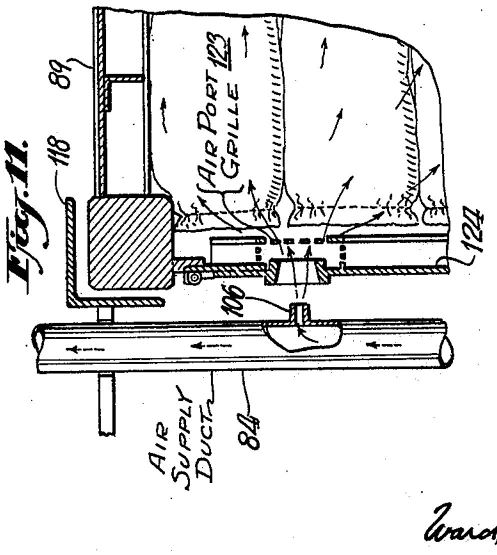
FIG. 11 is a fragmentary plan view taken along a corner of the storage van of FIG. 10 and illustrating the relative positions of a supply air nozzle and an inlet port of such storage van.

FIG. 11 comprises a fragmentary sectional view taken on a horizontal plane passing substantially through the center of the supply duct 84 and showing the construction of the Venturi type of tube or sleeve 121.

If desired the tube portion 121 may comprise a part of and be integral with a door 124 for the van 89.

If desired the vertical tube 121 need not be of a Venturi-like configuration. But preferably it coacts with the fixed nozzle 106 in such a way that it achieves the advantages aforementioned for the nozzle of FIG. 5, including air entrainment.

Figures 14, 15, 16:
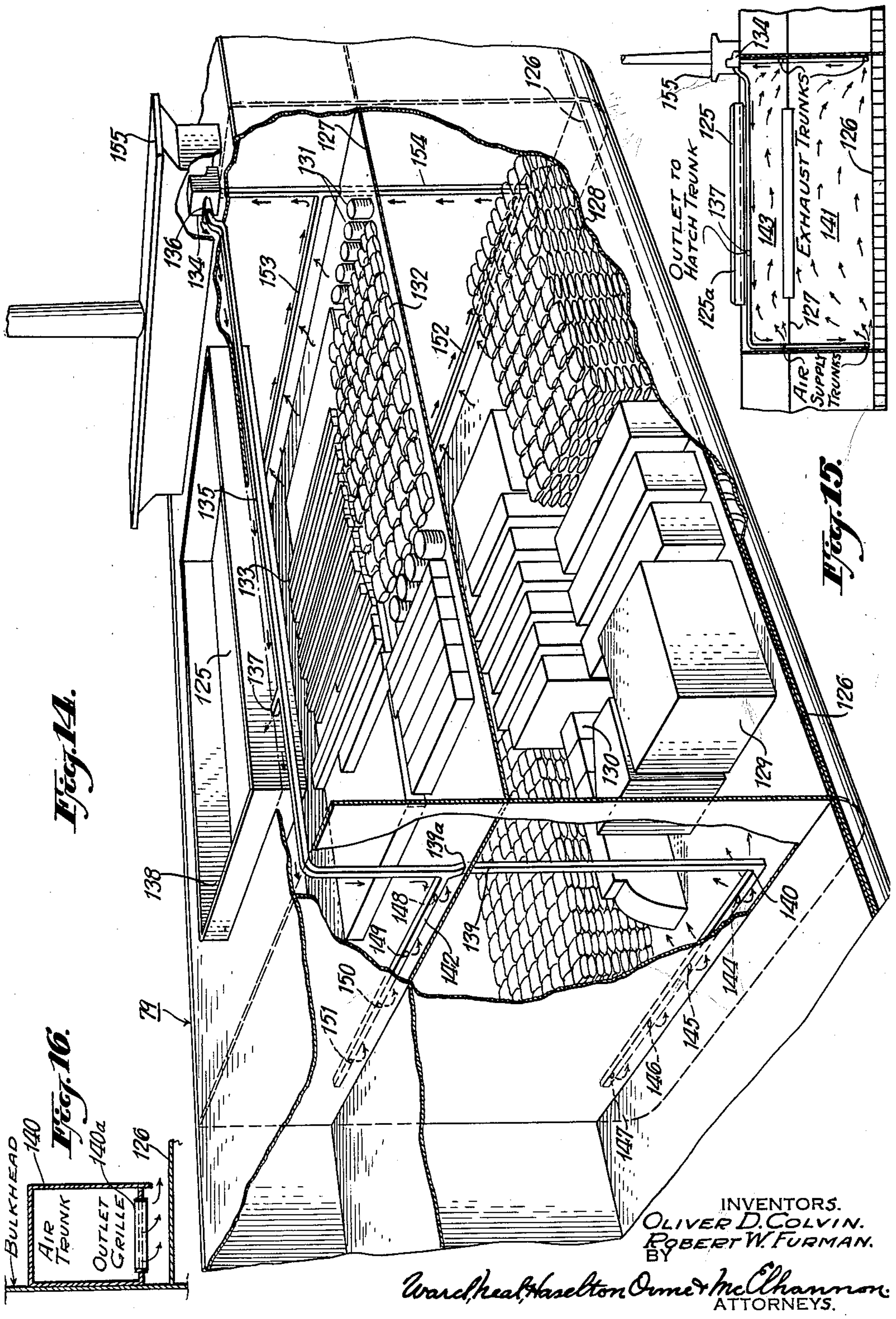
FIG. 14 is a perspective view, partly in section and with parts broken away, of a portion of a cargo carrying ship showing general cargo hold space and illustrating the relative positions of air supply and exhaust systems, also embodying a form of the present invention.
FIG. 15 is a longitudinal sectional view on a reduced scale of the general cargo space and such systems shown in FIG. 14.
FIG. 16 is a vertical sectional view, on an enlarged scale with respect to FIG. 14, taken through one of the air trunks or ducts of FIG. 14 and showing the relative position of an outlet of the duct with respect to a deck of the hold.

Referring now to FIGS. 14, 15 and 16, there is shown one form of the invention applicable to general cargo space as opposed to van cargo space. The same ship aforementioned 79 (FIG. 7) is provided with general cargo hold 125 which is, for example, divided into two deck levels 126 and 127.

Typical general cargo which may be stowed in such spaces comprises for example: bags of footstuff such as 128, boxes such as 129 containing machinery, such boxes being of wood, and boxes 130 of corrugated cardboard.

On the deck 127 there may be stowed for example drums 131, bags of coffee 132, steel rails 133, and other miscellaneous cargo.

The hold 125 is normally covered during a voyage by a hatch cover 125*a* (FIG. 15).

Figure 27:
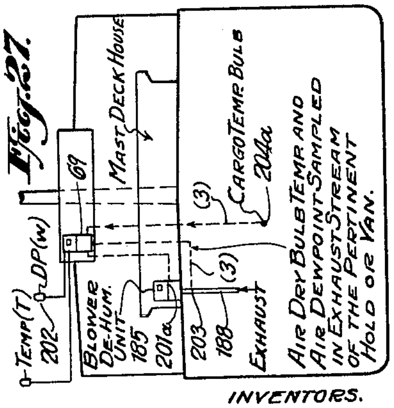
FIG. 27 is a lateral cross-sectional view of a vessel embodying the present invention and showing schematically the aforementioned control element or console of FIG. 26, together with a dehumidifier unit as shown in FIG. 21 and illustrating schematically the operative interconnection between such elements and certain of the temperature-sensing devices employed in the present invention.

The novel system embodying one form of the present invention includes a blower dehumidifier unit 134, which may be situated as shown in FIG. 14 (or in FIG. 27 at 201*a*), and which is under the influence of the central control means 69 in a manner analogous to that shown in FIGS. 1 and 27 and to be described more fully hereinafter.

The blower dehumidifier unit 134 may embody the aforementioned Munters patent rights. It is provided with a main horizontal outlet duct 135, to which it is connected at 136. Such horizontal outlet duct is provided at 137 with an outlet to the square of the hatch 138.

The duct 135 directs the dried air from the dehumidifier blower unit 134 preferably to a single vertical air supply trunk 139 which passes through the deck level 127 at 139*a* and is of sufficient vertical length to extend substantially to the lower deck level 126 in the manner shown in FIGS. 14–15. There is connected to the lower extremity of the vertical air supply trunk 139 a horizontal air trunk 140 (FIG. 16) for supplying lower hold 141 (FIG. 15) and there is in turn connected to the vertical air supply trunk 139 a further horizontal air supply trunk 142 for supplying hold space 143 (FIG. 15).

The lowermost air supply trunk 140 in turn is provided with a plurality of outlet ports 144–147 inclusive and analogously the upper of the two horizontal air supply trunks 142 is provided with outlet ports 148–151 inclusive.

As shown in FIG. 16 an outlet port 140*a* in the air supply trunk 140 is spaced closely adjacent to but above the deck 126 and directs air to the bottom of the hold space 141 in the manner shown in FIG. 15. Analogously the several outlet ports 148–151 in the trunk 142 direct air as shown in FIGS. 14 and 15.

The system of exhaust trunks for these two hold spaces is also shown in FIG. 14 and comprises a lower exhaust trunk 152 having a plurality of inlet or exhaust ports (not shown) analogous to those previously described for the air supply trunks, and also an exhaust trunk 153 which is analogously provided with a plurality of exhaust inlet ports. These two horizontal exhaust trunks 152 and 153 in turn are connected, for example, at their starboard extremities to the main vertical exhaust trunk 154.

The latter vertical exhaust trunk 154 in turn is connected to the aforementioned dehumidifier blower unit 134 which may be as aforementioned analogous to the dehumidifier blower unit 61 of FIG. 1 or that of FIG. 17 or 21 to be described more fully hereinafter.

If desired the dehumidifier blower unit 134 may be located within a mast deck house 155.

Referring to FIGS. 17–20 there will now be described a dehumidifier blower unit which may be employed in one form of the present invention. It has been mentioned heretofore that such dehumidifier blower unit, for example 134 (FIG. 14) and 61 (FIG. 1) may embody the Munters patent rights which does not make use of a silica gel type of dehumidifier. On the other hand, if desired, a silica gel or other solid or liquid desiccant type of dehumidifier may be employed, and this will be described in connection with FIGS. 17–20, inclusive.

The dehumidifier blower unit and the dehumidifier system of FIGS. 17–20 is of the decentralized type in lieu of a centralized dehumidifier system. One important advantage of the decentralized system is, as aforementioned, that it permits the installing of such individual hold dehumidifier units in or on existing ships not originally designed therefor principally because no engine room space is needed nor are large ducts connected therewith.

Figures 17, 18, 19, 20:
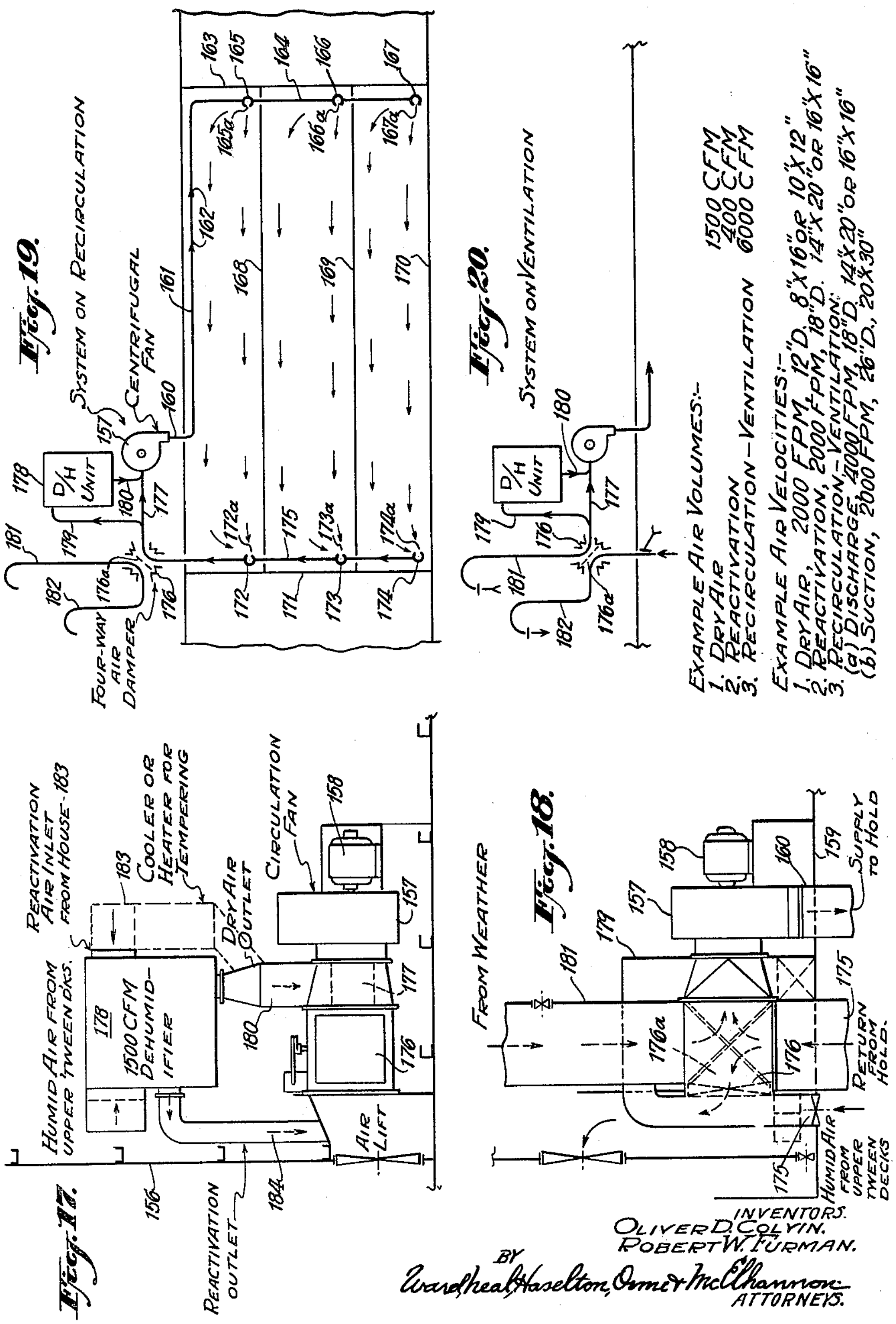
FIG. 17 is a plan view of a portion of the novel system embodying the present invention and comprising a dehumidifier unit in combination with a fan and damper device and which is arranged for occupying a heretofore unattained small space, such dehumidifier system embracing a dehumidifier unit of, for example, a silica gel type.
FIG. 18 is an elevation of the parts shown in FIG. 17.
FIG. 19 is a schematic cross-sectional view longitudinally of a hold of a vessel embodying one form of the novel system of the present invention and showing such system on "recirculation"
FIG. 20 is a fragmentary schematic view of a portion of the system shown in FIG. 19 but in a different operating position wherein the system is on "ventilation"

FIG. 17 is a plan view of a deckhouse 156 situated above the particular hold whose air is to be treated. For example, at an athwartship bulkhead line it contains such dehumidifier. Such deckhouses normally contain various other gear for example, winch controls, and boatswain supplies, and the like. One of the elements of the blower dehumidifier unit of FIG. 17 is a main circulating fan 157 which is driven by an electric motor 158. For a typical hold space, such as shown in FIG. 19, the electric motor is, for example, of 7½ H.P. and the fan of 6000 c.f.m. capacity, the latter delivering air through the bottom of the deckhouse deck 159 (FIG. 18) via a vertical outlet duct 160 to a horizontal trunk or duct 161 (FIG. 19) which runs forward directing air in the direction of the arrows 162. When the trunk 161 reaches the farthest bulkhead 163 it is directed downwardly and is connected with a vertical air supply trunk 164 and divides at each level, port and/or starboard, that is, it is connected at each level, port and starboard to thwartship ducts 165, 166, 167 with duct openings 165*a*, 166*a* and 167*a* respectively close to but spaced above their respective decks 168, 169 and 170 somewhat in the manner shown in connection with FIG. 16. The reason for this is to improve the penetration by the air of the space between the elements of cargo. At the after end of the cargo hold, namely, adjacent the after bulkhead 171 (FIG. 19), there are a plurality of exhaust ports such as 172*a*, 173*a* and 174*a* in thwartship ducts 172, 173 and 174 respectively, also for the decks 168, 169 and 170, and which are situated close to but spaced above such respective deck levels to receive the exhaust air into a vertical exhaust trunk 175 which collects same from athwartship branches and passes same up through a four-way air damper 176 having a damper blade 176*a* which is positioned, in the form shown in FIG. 19, to direct the air back to the centrifugal fan 157. This sets up a positive recirculation of air in the hold even though a large part of the airway may be blocked by cargo.

As illustrated in FIG. 19, there is connected in parallel with a horizontal conduit 177, which directs the air back to the centrifugal fan 157, a dehumidifier unit 178, such parallel connection being accomplished by means of ducts 179 and 180 (FIG. 19). The dehumidifier unit 178 can draw its air to be dried thus from the air in the inlet duct 177 to the fan, such air to be dried thus comprising a portion of the total flow in duct 177. Such air, which is drawn from the inlet duct 177 to the fan, passes through the dehumidifier unit 178 and is delivered in a very dried condition to the suction side of the fan 157 so that the capacity of the drier unit, which may, for example, be 1500 c.f.m, can be returned to the recirculating system. In this way the substantial portion of wettest air from the hold is dried cumulatively and redistributed via a much larger scouring volume, effectively reducing the amount of total moisture in the air in the hold and therefore reducing its dewpoint temperature.

Referring to FIG. 20, there is schematically illustrated the operation of the system of FIG. 19 but with the use of outside air, that is, when ventilation by outside air can be employed. The blade 176*a* of the four-way air damper 176 instead of being positioned as shown in broken lines in FIG. 19, may be positioned as shown in broken lines in FIG. 20 by turning same 90° so that air to be delivered to the ship's hold is drawn into the system via an inlet duct 181 and thence through the duct 177 to the fan and thence into the system as aforementioned. Exhaust air from the hold, in this particular setting of the blade 176*a*, is forced out of the system and overboard via an exhaust conduit 182. The dehumidification unit can be employed via ducts 179 and 180 as desired.

The dehumidifier unit 178 of FIG. 17, as aforementioned, may be of the solid or liquid desiccant type and thus will require a conduit 183 for the admission of heated air to reactivate the beds. Further there may be required a conduit 184 as an outlet for such reactivation medium.

Reverting now to a decentralized type of dehumidification system embodying the present invention as opposed to the prior art centralized system, such prior art practice, even though the latest known, has required a central large room or compartment in or adjacent to the engine room where sources of heat, steam, salt water for cooling, condensate and other drain pipes and so forth are easily accessible. This space is valuable and very expensive in which to install any unit such as a heavy dehumidification plant. It is normally too crowded with other marine equipment to afford adequate space and sometimes no space at all can be found there for dehumidifiers. On ships which have already been built and have not been specially designed for receiving dehumidifier equipment, it is substantially impossible to add a dehumidification unit in or near such engine spaces after the ship is built. Currently about 400 square feet of space is required in the engine room for this purpose. By means of the system embodying the present invention, no engine room space at all is required. Furthermore, instead of requiring 40 square feet, for example, for damper housing alone in the deckhouses at each end of a hold, totaling 80 square feet, the system embodying the present invention, for example, as in FIGS. 21–24, inclusive, occupies only 60 square feet for dampers, blowers and dehumidifiers in toto and in but one end of each hold.

Although the dehumidifier unit shown in FIGS. 17 and 18 is shown beside the blower and the four-way air damper, it is possible to rearrange same to occupy less space, for example, as shown in FIGS. 21–24, wherein it is advantageous to employ the apparatus embodying the aforementioned Munters patent rights, the dehumidifier unit being employed directly over the blower so that a total of approximately 35 to 40 square feet of deck space is all that is required. This small system treats an entire hold. This can be accommodated within a height of 7 or 8 feet. Consequently, the saving is very substantial in deckhouse space alone. Thus 40 square feet is required in but one deckhouse as opposed to 40 square feet in each of two deckhouses per hold in accordance with the prior art, a saving of 240 square feet, Also, the entire 400 square feet required for the prior art apparatus in the most expensive space in the ship, namely, in the engine room, is completely eliminated.

Furthermore, in the prior art centralized dehumidifier system large supply ducts must bring in outside air to be dried. Also, further fresh air must be furnished to the engine room to provide reactivation air (for the desiccant beds) which is heated and then is blown overboard through corrosion proof wet air ducts having picked up its load of water vapor. This requires very special and expensive long hot dipped galvanized ducts to carry this wet reactivated air overboard which usually produces condensation en route as it meets progressively cooler surfaces. As the air for the holds is dried it must be carried fore and aft to the separate holds. Often, for example, 400 feet of such ducts or pipes have been required in the prior art systems but by the present system embodying the present invention this dry air line is eliminated completely. Furthermore, the system embodying the present invention as compared to prior systems will save a minimum weight of about 25 tons per ship. Also, it will save approximately 55% of the energy required from the boilers for reactivation heat and for generating electric current to operate the system.

But above all there will be no expensive space usurped in the engine room to accommodate this new system. Further, there will be no watertight valves where the watertight bulkheads are pierced for dry air ducts. Furthermore, modern ships have electric cargo winches at each hold. No extra power wiring or electrical conduits are required to carry the current to run the dehumidifier blower units of this system, it being possible to connect on to the electrical conduits which are directed to the cargo winches at each hold and thus cause such electrical conduits to serve two duties which are never simultaneous. At sea the cargo winches are not used so there is available adequate power and electrical capacity of the conduits. When in port if the winches of a cargo hold are in operation, the hatches are open to the weather and the heavy power for dehumidifying is not required though the low powered fans can be used to increase the comfort and productive roll of the longshoremen. If a hold remains closed in port, its winches are not in use and the power therefor can be employed for energizing the dehumidification system of the present invention preserving the safe dewpoint condition in the hold.

Furthermore, one or more holds can be fitted on new or existing ships. Dehumidification can be used as required in different holds independently and automatically as desired. This flexibility is impossible with prior practice. The cost of a usual dehumidifer system of the prior art, including damper housings and usual related equipment, is a well defined figure which can be very substantially reduced by employing the system embodying the present invention. In general, it is believed that a ship owner, by employing the system of such present invention, will save approximately 25% of the total cost as compared with prior art systems. In addition to this such ship owner will have all of the other space, weight, and power savings aforementioned during the entire life of the ship. And most important, the quick dewpoint drop feature of the localized system gives immediate effect where it is needed which the prior art systems cannot provide.

Furthermore, and one of the most important advantages of the present invention is that it permits the installation of a dehumidifier system in ships already built and existing and which were not originally designed for receiving such system. Furthermore, it eliminates the problems with respect to diesel ships which have poor steam sources for reactivation of drier beds but which do have adequate power for winches and therefore for dehumidification.

Figures 21, 22, 23, 24, 25:
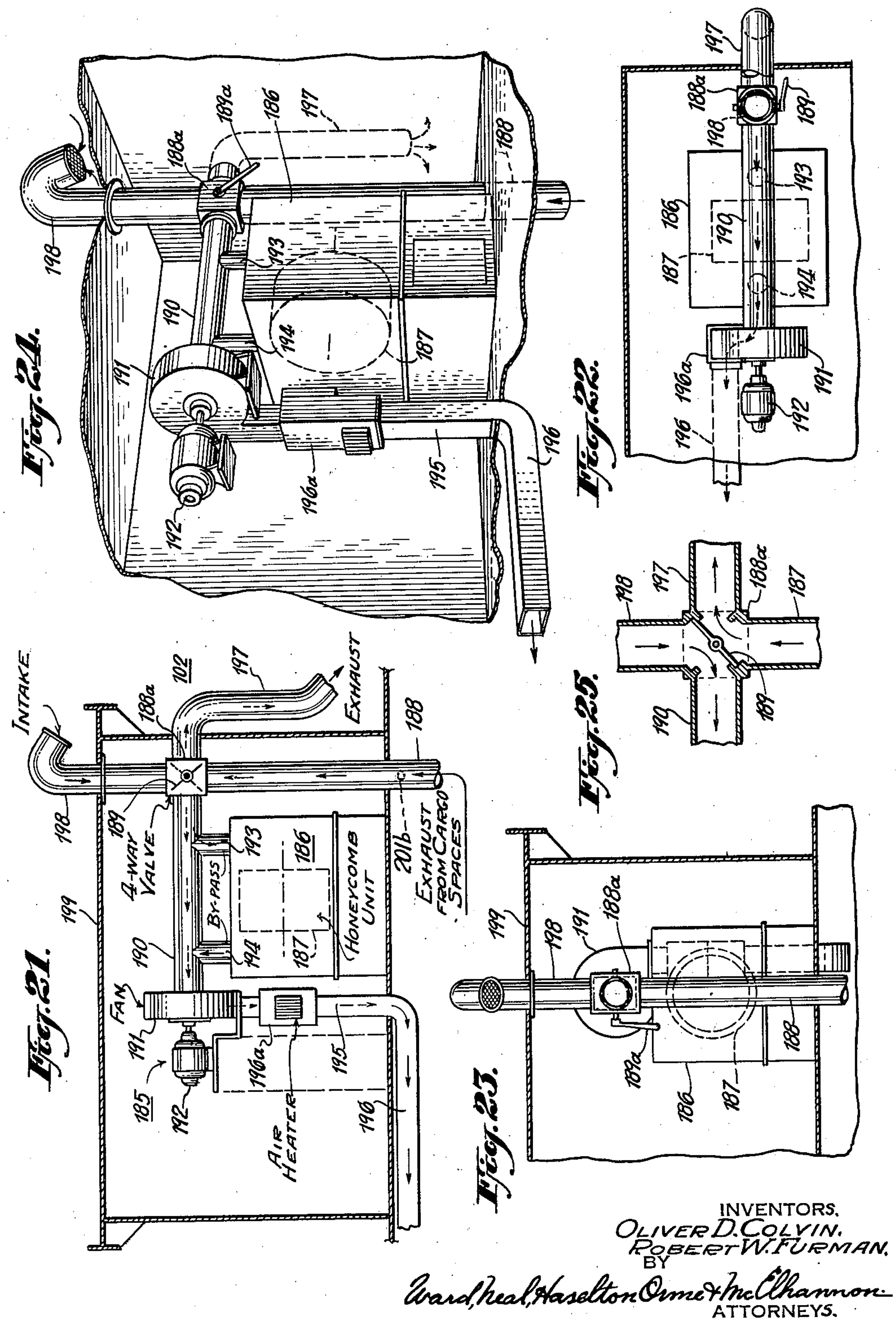
FIG. 21 is a side elevation of a dehumidifier system of a different type as compared to that of FIG. 17 and embracing a fan and dehumidifier unit embodying the aforementioned Munters patent rights.
FIG. 22 is a plan view of the apparatus shown in FIG. 21.
FIG. 23 is an end elevation of the apparatus shown in FIG. 21.
FIG. 24 is a perspective view of the apparatus shown in FIG. 21.
FIG. 25 is a detailed view on a somewhat enlarged scale with respect to FIGS. 21–24 showing a control valve or damper employed in the apparatus of FIGS. 21–24.

Referring now to FIGS. 21–25, there will be described a dehumidifier blower unit 185 which embodies the aforementioned Munters patent rights and in which the various elements thereof are relatively so situated that a minimum volume of space is occupied. The feasibility of one form of the present invention is attributable to such a very small volume required for this particular type of dehumidifier blower unit. It embraces a dehumidifier proper 186 employing a honeycomb element 187. The dehumidifier unit 186 is connected into the system analogously to the dehumidifier unit 178 of FIG. 19. That is, it is connected so that air is drawn into it between a damper and the fan and is directed thence to the suction side of the fan. Thus, as shown in FIG. 21, a vertical exhaust trunk or duct 188 is provided which is analogous to duct 175 of FIG. 19 and which brings exhaust air from the cargo spaces upwardly to a four-way damper valve 188a having a damper blade 189, these being analogous to the damper 176 with blade 176a of FIG. 19. The four-way damper 188a, as shown in FIG. 21, has the damper blade thereof positioned, as shown in solid lines, wherein air from the exhaust trunk 188 is directed to the left, as viewed in this figure, via a horizontal duct 190 to a fan 191 driven by a motor 192. The fan 191 and motor 192 are, of course, analogous to fans 157 and 158 of FIGS. 17–20, and the duct 190 is analogous to the duct 177. It is to the aforementioned duct 190 that the dehumidifier unit 186 is connected in parallel by means of bypass ducts 193 and 194, the former being the intake duct and the latter the output duct which is directed adjacent to the suction side of the fan 191. The fan 191 in turn directs its output via a vertical duct 195 to a horizontal air supply trunk 196, there being interposed in such vertical duct 195 an air heater 196*a*.

Reverting to the four-way damper valve 188*a*, there is connected thereto an exhaust trunk 197 and an air intake trunk 198 through which air is directed, as indicated by the arrows in the drawing when the damper blade 189 is shifted in its position 90° to the position shown in broken lines in FIG. 21.

The dehumidifier device 186 of FIGS. 21–24 is contained in a housing comprising a cube of approximately 3½ feet on a side and occupies thus about 40 cubic feet. The fan 191 and motor 192 and also the duct 190 are located above the dehumidifier unit 186 thereby to minimize the space requirements of this dehumidifier blower unit, it being possible to contain the entire blower dehumidifier device and all attendant dampers and housings in a height of about 7 feet, as shown in FIG. 21. This contrasting from and superseding prior practice. The space requirements of a deckhouse 199 for housing this unit is extremely low.

The damper blade 189, in the form shown, has attached thereto a handle 189*a* by which the angular position of the blade can be controlled. However, this blade can be automatically shifted by suitable means under the influence of the control console 69, as will be set forth below.

Referring now to FIGS. 26–29, there will be described briefly the central control means or control console 69 and its operative interconnection to the system embodying the present invention. Such central control means 69 (FIG. 26) embodies the inventions disclosed in U.S. Patent 2,822,743 aforementioned and includes recorder means (not shown) for making a graph 200 (FIGS. 26 and 28) for depicting conditions which indicate ship-sweat where the temperature of the skin of the ship (as indicated by the weather temperature "T" above the water line and sea water temperature "S" below the water line) falls below the dewpoint temperature of the air within a given hold, such as hold No. 3 represented by the numerals 3 printed on the graph as shown in FIG. 28.

Figure 26:
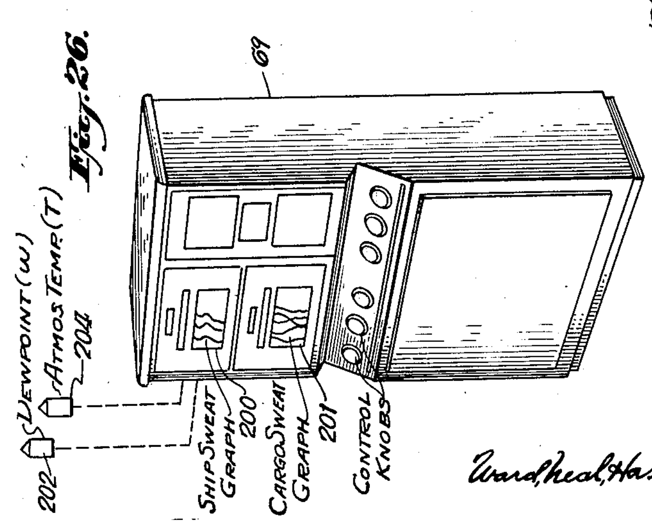
FIG. 26 is a perspective view of a control console embodying the invention of Patent No. 2,822,743 and which comprises an element of one form of the present invention.

The central control means 69 also embraces means for making a cargo-sweat graph 201 analogous to the ship-sweat graph 200 but adapted for indicating conditions reflective of cargo-sweat (FIGS. 26 and 29).

The cargo-sweat graph 201 is produced by a recorder mechanism which imprints on a moving strip, a moving tape, or a moving disc, a number of characters representative of the several pertinent temperatures as shown in FIG. 29, this also being done in the case of the graph 200 of FIG. 28.

The several conditions which are recorded by the recorder for making the ship-sweat graph 200 include, by way of example and as shown in FIG. 28, the following:

D—indicating the dry air dewpoint temperature furnished by the dehumidifier, this being printed in a suitable color, such as brown;

4—indicating the dewpoint temperature of the air in hold No. 4, this being printed, preferably, in green;

W—for the dewpoint temperature of the weather air (reddish purple);

3—for the dewpoint temperature in hold No. 3 (green);

S—for the sea water dry bulb temperature (red); for skin temperature below the water line; and T—the dry bulb temperature of the weather air (red) for skin temperature above the water line. By this color code it can be sensed at a glance and at a distance of six feet or more that if the green lines are to the left of the red or reddish purple lines there is no ship-sweat. If one green line approaches a red or reddish purple line, danger is forecast for the numbered hold. If a green line crosses or has crossed a red line sweating is underway. Thus hours of ample warning are furnished the responsible officers at the bridge where action can be taken immediately.

The temperature D comprising the dewpoint temperature of the dehumidified air delivered to the hold is measured by a suitable dewpoint sensing device, such as 201*a*, located in the output stream of the blower dehumidifier unit 185 (FIG. 21). The dewpoint of the air in hold No. 4, represented by the green numeral 4, is sensed by a suitable Dewcell 201*b* shown in the return air duct 188 from the hold No. 4 which may be identical to Dewcell 70 of FIG. 1. The weather dewpoint temperature W is sensed by the Dewcell 202 (FIG. 26) and is operatively connected to the recording means by a suitabile device not shown. The dewpoint temperature of the air in hold No. 3, represented by the green numeral 3 of FIG. 28, in the form shown in FIG. 27 is sensed by a suitable dewpoint sensing device 203 (FIG. 27) in the output stream from the pertinent hold or van, in this case hold No. 3. The sea water temperature S is sensed by any suitable thermometer (not shown) which is operatively connected to the recorder for indicating the red letter S as on the graph 200. Furthermore, the weather dry bulb temperature T (red) is sensed by thermometer 204 and operatively connected to the apparatus for recording as shown in FIG. 26.

Regarding the cargo-sweat graph, FIG. 29, the dewpoint of the air in hold No. 3, represented by the green numeral 3, is sensed by the aforementioned dewpoint temperature sensing device 203 (FIG. 27) whereas the dry bulb temperature of the cargo in hold No. 3 is sensed by a suitable temperature probe 204*a* (FIG. 27) which is operatively connected to the control console 69 and its recorder for producing the indication of cargo dry bulb temperature represented by the red numeral 3.

On the other hand, the numeral 3 is also employed in a distinctive color, such as black, on the graph for representing the air dry-bulb temperature in the hold No. 3 to aid in control of tempering. For purposes of distinguishing the three graph lines all employing the common numeral 3 in this description, that of the hold dewpoint temperature is designated 3*h*, that of the cargo dry bulb temperature 3*c*, and that of the hold air dry bulb temperature 3*t* though in practice it is now practical to use a color code which is more easily understood and freer of errors of judgment. Again if the green dewpoint temperature is to the left of the red cargo temperature of the same number the cargo in that hold is not sweating; if they approach each other the time at which sweating will occur can be forecast by the rate of approach of the tracks, and tempering can be speeded up by heating the recirculating air, which will show in a shift to the right of the black numeral. As explained dehumidification must be maintained as heating cargo will usually evaporate its moisture and increase the dewpoint at the cargo surfaces.

Reverting to the ship-sweat graph, FIG. 28, it will be seen that the lowest temperatures of the ship above and below the water surfaces are represented by the line of red T's designated 205*a*, and the line of red S's designated 205*b*, it being understood that the sides of the ship are at substantially the same temperatures as the outside weather dry bulb temperature and sea water temperature. The dewpoint temperature of the air in hold No. 3, as shown in FIG. 28 by green line 205, commenced to trend sharply toward the lines 205*a* and 205*b* approximately at 1700 hours, as shown in FIG. 28. At 1840 hours below water line and 1900 hours above water line respectively, such hold dewpoint temperature became greater than the temperature of the ship side and ship-sweat ensued commencing at 1840 below the water line and 1900 above the water line and continued until after 2400.

In accordance with the present invention, suitable automatic means are provided for sensing when the weather temperature and the dewpoint temperature of the hold reach a selected minimum differential and automatic means (not shown) are employed for preventing the occurence of the condition shown in FIG. 28 by actuating the dehumidifier blower unit, for example, as shown in FIG. 21, keeping the dewpoint in hold No. 3 lower than the weather temperature T and sea water temperature S. Under the conditions shown in FIG. 28, in hold No. 3 this condition could be prevented by controlling the four-way air damper **188*a* so that the weather air, which is of lower dewpoint temperature, is forced into No. 3 hold by the fan 191** under ventilation, either with or without dehumidification, depending upon the rapidity of drying which is required under the circumstances.

Referring now to FIG. 29, the condition of cargo-sweat represented therein (hold No. 3) and which commenced about 1600 ending at 2300 could have been prevented by warming the cargo, as by the heater **196*a***, to a point wherein it would be above the dewpoint temperature of the air in the hold or, alternatively, the dewpoint temperature (3*h*) of the hold No. 3 could have been depressed by placing the damper blade 189 in the position shown in FIG. 21 and starting up the motor 192 and the dehumidifier unit 186 to depress such dewpoint temperature to prevent the crossing of the lines as shown. Preferably both should have been put into operation before 1500 when it was becoming obvious that cargo-sweat would inevitably occur without remedial action.

Here again, suitable means can be employed for sensing a negative or a minimum positive differential occurring between the temperatures 3*h* and 3*c* to take the action aforementioned to prevent the 3*h* temperature from rising above the 3*c* temperature. Such means can be automatic and can actuate the system whenever the differential occurs.

What is claimed is:

1. In a dehumidification system for a ship having a plurality of separate holds, a like plurality of dehumidifier devices, one for each hold, each being located adjacent its respective hold and having a conduit system for interconnecting same thereto for recirculating the air therein; each of said devices including fan means for moving the air through such hold and conduit system to accomplish such recirculation; means for bypassing via said dehumidifier device a selected fraction of the total air flow moved by said fan means; means for sensing the dewpoint temperature of the air of each of said holds, the dry bulb temperature of the weather air, and the sea water in which such ship floats; and means for automatically initiating the operation of any one of said dehumidifier devices in response to the occurrence of a selected difference between the dewpoint temperature of such a hold and one of said dry bulb temperatures.

2. In a dehumidifier system for a ship having a hold for cargo contained in a plurality of vans, means for holding in stacked relation in such hold such plurality of vans, each van having inlet and outlet port means, a dehumidifier apparatus for such hold, means for operatively interconnecting such dehumidifier apparatus to such stacked vans comprising an air distribution system of conduits embracing a subsystem of conduits for conducting air from such dehumidifier apparatus to such vans and including separate nozzle means for each van, which nozzle means in turn embraces a nozzle positioned to direct air into the inlet port means of each van, such air distribution system also including a subsystem of return conduits for returning to said dehumidifier apparatus air discharged into the hold from said van outlet port means.

3. Apparatus in accordance with claim 2 wherein said nozzle means for each van includes a main nozzle and a sleeve member positioned for coacting therewith to induce entrainment of air from the hold and into said inlet port means in response to action of the air jet emanating from said main nozzle.

4. In a dehumidifier system for a ship having a plurality of separate holds, means for closing each hold to the outside atmosphere; a like plurality of dehumidifier apparatus, one for each hold, each such apparatus being selected of a minimum size and capacity required by its respective hold for dehumidifying the air thereof and situated adjacent its respective hold and provided with its separate air distribution system independent of the air distribution systems of the other dehumidifiers, each of said dehumidifier apparatus including fan means for recirculating the air in its respective hold thereby cumulatively to dry same by its respective dehumidifier means while maintaining its dewpoint temperature below the dry bulb temperature of the cargo and of the interior surfaces of the hold, a single central control apparatus for the plurality of said dehumidifier apparatus including means for operatively interconnecting said apparatus to actuate one or more of said dehumidifier apparatus in response to the occurrence of selected conditions in each hold, said single control apparatus including means for sensing the dry bulb temperature of the outside or weather air, and means for sensing the dewpoint temperature of the air in each hold, and means for initiating the operation of any one of said dehumidifier apparatus in response to the occurrence of a selected difference between the dewpoint of the temperature of the air in any hold and said dry bulb temperature of the weather air.

5. Apparatus in accordance with claim 4 wherein said central control apparatus includes means for sensing the dry bulb temperature of the sea water in which such ship floats, and means for initiating the operation of any one of such dehumidifier apparatus in response to the occurrence of a selected difference between the dewpoint of the air in any hold and such temperature of the sea water.

6. Apparatus in accordance with claim 1 wherein at least one of said dehumidifier devices also includes means for warming the air passing therethrough to a temperature warmer than the temperature of said cargo.

7. Apparatus in accordance with claim 4 wherein said central control apparatus includes means for sensing the dry bulb temperature of the cargo in the various holds, and means for initiating the operation of any one of such dehumidifier apparatus in response to the occurrence of a selected difference between the dewpoint of the air in any hold and such temperature of its respective cargo.

References Cited in the file of this patent

UNITED STATES PATENTS

| | | |
|---|---|---|
| 1,430,750 | Perkins | Oct. 3, 1922 |
| 1,749,763 | Fleisher | Mar. 11, 1930 |
| 1,981,234 | Hetzer | Nov. 20, 1934 |
| 2,049,711 | Lundy | Aug. 4, 1936 |
| 2,160,831 | Colby | June 6, 1939 |
| 2,249,624 | Bichowsky | July 15, 1941 |
| 2,342,998 | Bieret | Feb. 29, 1944 |
| 2,442,344 | Curtis | June 1, 1948 |
| 2,499,328 | Pawlansky | Feb. 28, 1950 |
| 2,584,727 | Mellen | Feb. 5, 1952 |